United States Patent
Okawa

(10) Patent No.: US 10,070,129 B2
(45) Date of Patent: Sep. 4, 2018

(54) IMAGE CODING APPARATUS, IMAGE CODING METHOD, IMAGE DECODING APPARATUS, IMAGE DECODING METHOD, AND PROGRAM

(71) Applicant: CANON KABUSHIKI KAISHA, Tokyo (JP)

(72) Inventor: Koji Okawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 627 days.

(21) Appl. No.: 14/356,506

(22) PCT Filed: Nov. 5, 2012

(86) PCT No.: PCT/JP2012/007065
§ 371 (c)(1),
(2) Date: May 6, 2014

(87) PCT Pub. No.: WO2013/069245
PCT Pub. Date: May 16, 2013

(65) Prior Publication Data
US 2014/0334538 A1    Nov. 13, 2014

(30) Foreign Application Priority Data

Nov. 7, 2011 (JP) .................................. 2011-243940

(51) Int. Cl.
*H04N 19/124* (2014.01)
*H04N 19/119* (2014.01)
(Continued)

(52) U.S. Cl.
CPC ......... *H04N 19/119* (2014.11); *H04N 19/124* (2014.11); *H04N 19/197* (2014.11); *H04N 19/436* (2014.11); *H04N 19/91* (2014.11)

(58) Field of Classification Search
CPC .. H04N 19/119; H04N 19/124; H04N 19/197; H04N 19/436; H04N 19/91; H04N 19/00; G06T 9/00
(Continued)

(56) References Cited

U.S. PATENT DOCUMENTS

2007/0086528 A1* 4/2007 Mauchly ............. H04N 19/174
375/240.24
2007/0171969 A1 7/2007 Han
(Continued)

FOREIGN PATENT DOCUMENTS

CN        101383967 A     3/2009
EP        1696675 A3      9/2009
(Continued)

OTHER PUBLICATIONS

Rapporteur Q6/16; "H.264 Advance Video Coding for Generic Audiovisual Services;" Mar. 21, 2011.
(Continued)

*Primary Examiner* — Behrooz Senfi
(74) *Attorney, Agent, or Firm* — Canon U.S.A., Inc. IP Division

(57) ABSTRACT

An image coding apparatus configured to divide an image into one or more slices each including a plurality of blocks and to code each slice on a block-by-block basis includes a first coding unit configured to code blocks included in a first portion of the slice, and a second coding unit configured to code blocks included in a second portion of the slice, wherein, when the second coding unit codes an initial block in the second portion, the second coding unit codes the initial included in the second portion by referring to a first quantization parameter provided to the slice as an initial value and referred to by the first coding unit when the first coding units codes the initial block in the first portion.

32 Claims, 25 Drawing Sheets

(51) Int. Cl.
*H04N 19/196* (2014.01)
*H04N 19/436* (2014.01)
*H04N 19/91* (2014.01)

(58) Field of Classification Search
USPC .................................................. 375/240.03
See application file for complete search history.

(56) References Cited

U.S. PATENT DOCUMENTS

| | | | |
|---|---|---|---|
| 2008/0253450 A1* | 10/2008 | Lin ..................... | H04N 19/15 375/240.04 |
| 2009/0141798 A1 | 6/2009 | Adachi | |
| 2013/0057646 A1* | 3/2013 | Chen ................... | H04N 19/597 348/43 |
| 2013/0114736 A1* | 5/2013 | Wang .................. | H04N 19/176 375/240.24 |
| 2013/0129238 A1* | 5/2013 | Sasai .................... | G06T 9/00 382/233 |

FOREIGN PATENT DOCUMENTS

| | | |
|---|---|---|
| EP | 2290985 A1 | 3/2011 |
| JP | 2011-223358 A | 11/2011 |
| RU | 2406258 C2 | 12/2010 |
| RU | 2420023 C1 | 5/2011 |
| WO | 2009/150808 A1 | 12/2009 |

OTHER PUBLICATIONS

Muhammed Coban et al; "CU-LEVEL QP Prediction;" Mar. 16, 2011-Mar. 23, 2011, pp. 1-3.

Kiran Misra et al.; "Periodic Entropy Coder Initialization for Wavefront Decoding of Video Bitstream;" 2011, 18th IEEE International Conference on Image Processing; Sep. 11, 2011 pp. 3517-3520.

Arild Fuldseth (Cisco) A et al.; "Tiles;" Joint Collaborative Team on Video Coding (JCT-VC); Jul. 18, 2011-Jul. 22, 2011, No. m 20757 Jul. 14, 2011.

Gordon Clare et al.; "Wavefront Parallel Processing for HEVC Encoding and Decoding;" Joint Collaborative Team on Video Coding (JCT-VC); 6th Meeting; Torino, IT; Jul. 14-22, 2011; pp. 1-16.

\* cited by examiner

IMAGE CODING APPARATUS, IMAGE CODING METHOD, IMAGE DECODING APPARATUS, IMAGE DECODING METHOD, AND PROGRAM

TECHNICAL FIELD

The present invention relates to an image coding apparatus, an image coding method, an image decoding apparatus, an image decoding method, and a program, and in particular, to a method for coding/decoding a quantization parameter in an image.

BACKGROUND ART

H.264/MPEG-4 AVC (hereinafter referred to as "H.264") is known as a coding method for use in compressing and recording a moving image (ITU-T H.264 (March 2010), Advanced video coding for generic audiovisual services). According to H.264, a difference in a quantization parameter from a block coded immediately before the current block is coded as mb_qp_delta information, whereby a quantization parameter of each block can be an arbitrary value.

Then, it is coded using a conventional binary arithmetic coding method adopted in H. 264. More specifically, each syntax element such as the above-described mb_qp_delta information is binarized, as a result of which a binary signal is generated. An occurrence probability is assigned to each syntax element in advance as a table (hereinafter referred to as an "occurrence probability table"). The above-described binary signal is arithmetically coded based on the occurrence probability table. Then, each time a binary signal is coded, the occurrence probability table is updated based on statistical information indicating whether the coded binary signal is the most probable symbol.

In recent years, an activity to standardize a further highly efficient coding technology as a successor of H.264 has started, and Joint Collaborative Team on Video Coding (JCT-VC) was established between ISO/IEC, and ITU-T. JCT-VC has been standardized a coding technology called High Efficiency Video Coding (hereinafter referred to as "HEVC").

In the standardization of HEVC, various kinds of coding methods have been widely considered in terms of not only improvement of coding efficiency but also other aspects including simplicity of implementation and a reduction in a processing time. To reduce a processing time, methods for improving parallelism have been also considered assuming that the coding method is used on, for example, a multi-core CPU. One of them is a method for realizing parallel processing of entropy coding/decoding called "Wavefront" (JCT-VC contribution, JCTV-F274.doc available on the Internet at <http://phenix.int-evry.fr/jct/doc_end_user/documents/6_Torino/wg11/>). A next coding target should be coded using an updated occurrence probability table, so the processing cannot be performed in parallel unless the statistical information is reset. However, this leads to such a problem that resetting the statistical information deteriorates the coding efficiency. In contrast, Wavefront makes it possible to code blocks line by line in parallel, while preventing the coding efficiency deterioration, by applying an occurrence probability table obtained at the time of completion of coding a plural pre-specified number of blocks to the leftmost block in the next line. This is mainly a description of encoding process, but it is also applicable to decoding process.

However, Wavefront makes it possible to improve parallelism of arithmetic coding/decoding of each line, but actually, quantization and inverse quantization cannot be performed until the quantization parameter of the immediately preceding block in raster scan is determined. Therefore, even the current implementation of Wavefront has a problem of inability to perform entire coding/decoding processing in parallel.

SUMMARY OF INVENTION

The present invention is directed to enabling parallel coding/decoding as entire processing including quantization/inverse quantization processing when blocks are coded/decoded line by line in parallel with the use of the Wavefront method.

According to an aspect of the present invention, an image coding apparatus configured to divide an image into one or more slices each including a plurality of blocks and to code each slice on a block-by-block basis includes first coding means configured to code blocks included in a first portion of the slice, and second coding means configured to code blocks included in a second portion of the slice, wherein, when the second coding means codes the initial block in the second portion, the second coding means codes the initial block included in the second portion by referring to a first quantization parameter provided to the slice as an initial value and referred to by the first coding means when the first coding means codes the initial block in the first portion.

According to exemplary embodiments of the present invention, it is possible to realize parallel coding/decoding as entire processing including quantization/inverse quantization processing when blocks are coded/decoded line by line in parallel with use of the Wavefront method.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Figure 1:
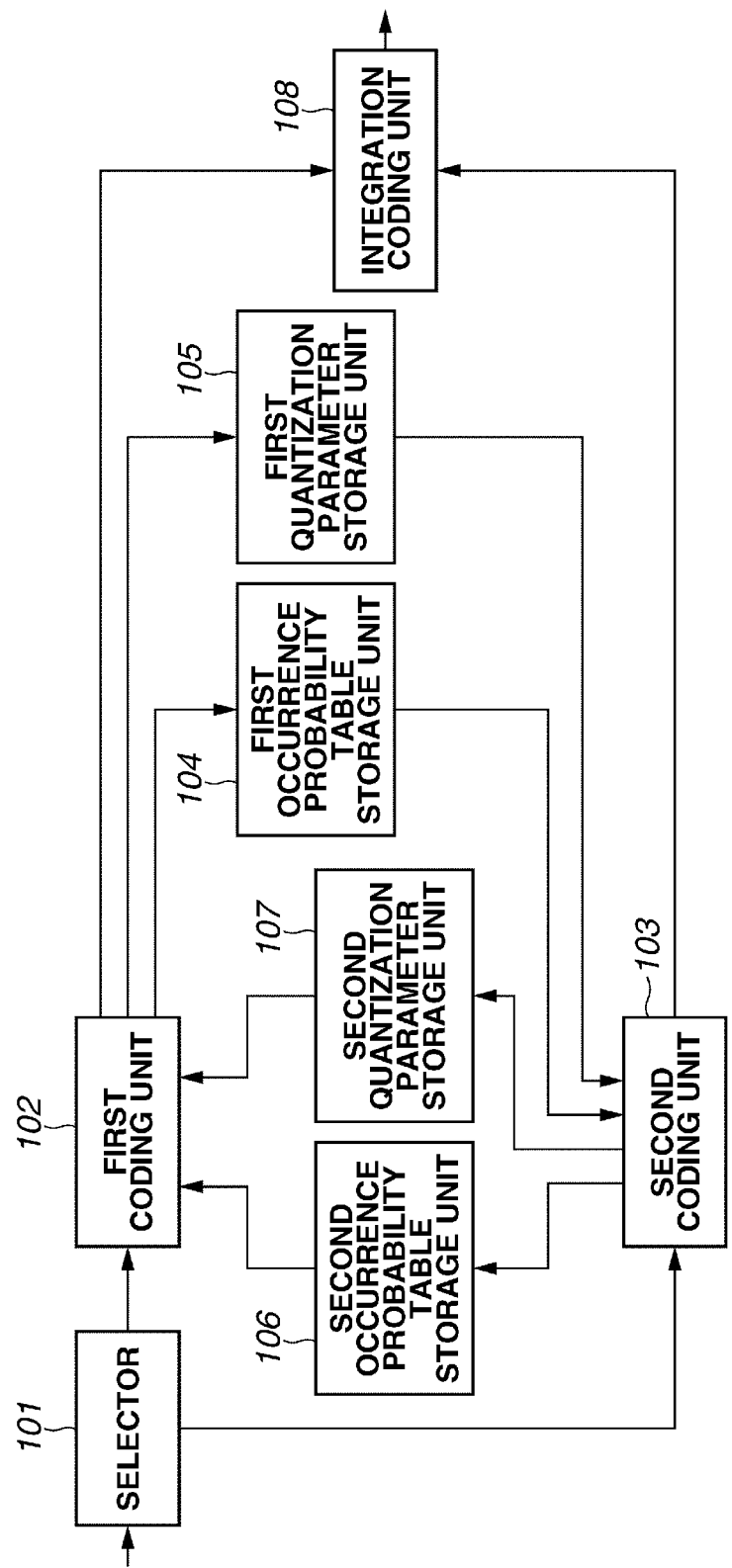
FIG. 1 is a block diagram illustrating a configuration of an image coding apparatus according to a first exemplary embodiment.

FIG. 1 is a block diagram illustrating an image coding apparatus according to a first exemplary embodiment.

Referring to FIG. 1, a selector 101 determines whether a processing target block belongs to an even-numbered block line. The selector 101 outputs the block to a first coding unit 102 if the block belongs to an even-numbered block line, and otherwise outputs the block to a second coding unit 103.

Figure 2:
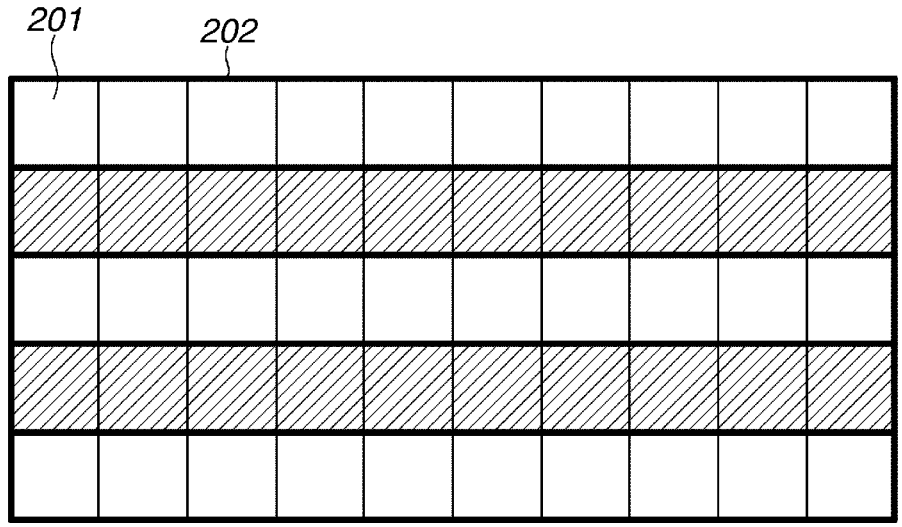
FIG. 2 illustrates configurations of block lines.

The first and second coding units 102 and 103 code blocks, into which an input image is divided by n×n pixels ("n" is a positive integer of 2 or larger), line by line as illustrated in FIG. 2 (the units corresponding to "first coding means" and "second coding means", and "coding blocks included in a first portion of the slice" and "coding blocks included in a second portion of the slice" in the claims). Hereinafter, a line of blocks will be referred to as a "block line". The present exemplary embodiment will be described based on an example using two coding units, but the present invention is not limited thereto. Referring to FIG. 2, a section 201 indicated as a square drawn by a thin line represents a block, and a section 202 indicated as a rectangle drawn by a thick line represents a block line. Further, blocks in white areas, which indicate even-numbered block lines including a top block line (the 0-th block line), are coded by the first coding unit 102. Blocks in shaded areas, which indicate odd-numbered block lines, are coded by the second coding unit 103.

Each of the first and second coding units 102 and 103 first generates prediction errors according to the prediction by referring to pixels surrounding the coding target block or another frame, and performs orthogonal transform to generate transform coefficients. Next, each of the first and second coding units 102 and 103 determines a quantization parameter for the orthogonally transformed transform coefficients, and quantizes each transform coefficient to generate quantization coefficients. Next, each of the first and second coding units 102 and 103 binarizes each syntax element including the quantization coefficients to generate binary signals. An occurrence probability is assigned to each syntax element in advance as a table (hereinafter referred to as an "occurrence probability table"). The binary signals are arithmetically coded based on the above-described occurrence probability table. Then, each time a binary signal is coded, the occurrence probability table is updated using statistical information indicating whether the coded binary signal is the most probable symbol.

A first occurrence probability table storage unit 104 stores the occurrence probability table generated by the first coding unit 102. Hereinafter, the occurrence probability table stored in the first occurrence probability table storage unit 104 will be referred to as a "first occurrence probability table".

A first quantization parameter storage unit 105 stores the quantization parameter determined by the first coding unit 102. Hereinafter, the quantization parameter stored in the first quantization parameter storage unit 105 will be referred to as a "first quantization parameter".

A second occurrence probability table storage unit 106 stores the occurrence probability table generated by the second coding unit 103. Hereinafter, the occurrence probability table stored in the second occurrence probability table storage unit 106 will be referred to as a "second occurrence probability table".

A second quantization parameter storage unit 107 stores the quantization parameter determined by the second coding unit 103. Hereinafter, the quantization parameter stored in the second quantization parameter storage unit 107 will be referred to as a "second quantization parameter".

An integration coding unit 108 integrates coded data generated by the first coding unit 102 and coded data generated by the second coding unit 103, and outputs the integrated data as a bit stream.

An operation of the image coding apparatus according to the present exemplary embodiment will be described in detail with reference to the flowcharts illustrated in FIGS. 3 to 6. In the present exemplary embodiment, moving image data is input frame by frame, is divided into blocks, and is processed in raster order. The present exemplary embodiment is configured to input moving image data frame by frame, but may be configured to input still image data corresponding to one frame or to input image data slice by slice, which a frame is divided into. Further, for simplification of description, the present exemplary embodiment will be described based on only intra prediction coding processing, but is not limited thereto. The present exemplary embodiment can be also employed to inter prediction coding processing.

First, in step S301, the image coding apparatus determines whether a processing target block belongs to a top block line. If the block belongs to the top block line (YES in step S301), the processing proceeds to step S302. If the block does not belong to the top block line (NO in step S301), the processing proceeds to step S303.

The processing of step S302 is processing for coding the top block line, the details of which will be described below. The processing of step S303 is processing for coding a block line other than the top block line, the details of which will be also described below. Further, the selector 101 determines whether the block line to which the processing target block belongs is an even-numbered block line or an odd-numbered bock line. If the block line is an even-numbered block line, the processing target block is coded by the first coding unit 102 independently. If the block line is not an even-numbered block line, the processing target block is coded by the second coding unit 103 independently.

Next, in step S304, the integration coding unit 108 integrates coded data output from the first coding unit 102 and coded data output from the second coding unit 103, and generates and outputs a bit stream.

Next, in step S305, the image coding apparatus determines whether all block lines in the processing target frame are coded. If all block lines are coded (YES in step S305), the processing for coding one frame is ended. If not all block lines are coded (NO in step S305), the processing proceeds to step S301 again, and coding of the next block line starts.

The processing of step S302 (the processing for coding the top block line) will be described in detail with reference to the flowchart illustrated in FIG. 4. The top block line is an even-numbered block line, so the processing target block is input into the first coding unit 102 by the selector 101, and is coded by the first coding unit 102.

First, in step S401, a quantization parameter, based on which a block is coded, is initialized so as to match an initial value of a quantization parameter for a slice. Hereinafter, the quantization parameter, based on which a block is coded, will be referred to as a "block reference quantization parameter". Regarding a quantization parameter used to quantize a coding target block, the value thereof itself is not coded as a syntax element, but a difference value thereof from the block reference quantization parameter is coded. In the present exemplary embodiment, this difference value corresponds to a value of cu_qp_delta in the HEVC method. However, the present invention is not limited thereto, and for example, the above-described difference value may correspond to a code of mb_qp_delta in the H.264 method. Next, in step S402, an occurrence probability table is initialized by a predetermined method. The initialized occurrence probability table is used to arithmetically code the first binary signal of the leftmost block in the block line, and is updated as necessary in step S403, which will be described below. Hereinafter, the occurrence probability table used to arithmetically code the first binary signal of the leftmost block in a block line will be referred to as a "block line reference occurrence probability table".

Next, in step S403, the first coding unit 102 codes pixel data block by block.

In the present exemplary embodiment, one block is constituted by 64×64 pixels, but the present invention is not limited thereto. The size of a block may be a smaller size such as 32×32 pixels, or a larger size such as 128×128 pixels. The block coding processing in step S403 will be described in detail with reference to the flowchart illustrated in FIG. 6.

First, in step S601, the first coding unit 102 performs intra prediction on an input image block with use of pixels surrounding the block to generate prediction errors.

Next, in step S602, the first coding unit 102 performs orthogonal transform on the prediction errors to generate transform coefficients. Further, the first coding unit 102 quantizes the transform coefficients using a quantization parameter (hereinafter referred to as a "block quantization parameter") determined based on, for example, the characteristics and the coding amount of the image to generate quantization coefficients.

Next, in step S603, the first coding unit 102 calculates a difference value between the above-described block reference quantization parameter and the block quantization parameter to generate a cu_qp_delta value.

Next, in step S604, the first coding unit 102 sets the block quantization parameter used to code the processing target block to the block reference quantization parameter, thereby updating the block reference quantization parameter. The block reference quantization parameter will be used to generate a cu_qp_delta value of a next block.

Next, in step S605, the first coding unit 102 binarizes each syntax element including the above-described cu_qp_delta value and the above-described quantization coefficients to generate binary signals. The first coding unit 102 uses various kinds of binarization methods such as unary binarization and fixed-length binarization while switching the binarization method for each syntax element in a similar manner to the H.264 method. Further, the first coding unit 102 arithmetically codes the binary signals based on the occurrence probability table.

Next, in step S606, the first coding unit 102 updates the occurrence probability table based on whether the arithmetically coded binary signal is the most probable symbol.

Next, in step S607, the first coding unit 102 determines whether all syntax elements in the block are arithmetically coded. If all syntax elements are arithmetically coded (YES in step S607), the block coding processing is ended. If not all syntax elements are coded (NO in step S607), the processing proceeds to step S605 again.

Referring back to FIG. 4, in step S404, the first coding unit 102 determines whether a condition for storing the block reference quantization parameter is satisfied. In the present exemplary embodiment, the condition for storing the block reference quantization parameter is whether the block coded in step S403 is a leftmost block in a block line. If the condition is satisfied (YES in step S404), the processing proceeds to step S405. In step S405, the block reference quantization parameter is stored in the first quantization parameter storage unit 105 as a first quantization parameter. If the condition is not satisfied (NO in step S404), the processing proceeds to step S406. The first quantization parameter will be used as a block reference quantization parameter when the second coding unit 103 codes the leftmost block in the next block line.

Next, in step S406, the first coding unit 102 determines whether a condition for storing the occurrence probability table is satisfied. In the present exemplary embodiment, the condition for storing the occurrence probability table is whether the block coded in step S403 is a predetermined number-th block from the leftmost block in the block line. If this condition is satisfied (YES in step S406), the processing proceeds to step S407. In step S407, the occurrence probability table is stored in the first occurrence probability table storage unit 104 as a first occurrence probability table. If the condition is not satisfied (NO in step S406), the processing proceeds to step S408. The first occurrence probability table will be used as a block line reference occurrence probability table when the second coding unit 103 codes the leftmost block in the next block line.

Next, in step S408, the first coding unit 102 determines whether all blocks in the processing target block line are coded. If all blocks are coded (YES in step S408), coding of the top block line is ended. If not all blocks are coded (NO in step S408), the processing proceeds to step S403 again. In step S403, the next block in raster order is coded.

Figure 5:
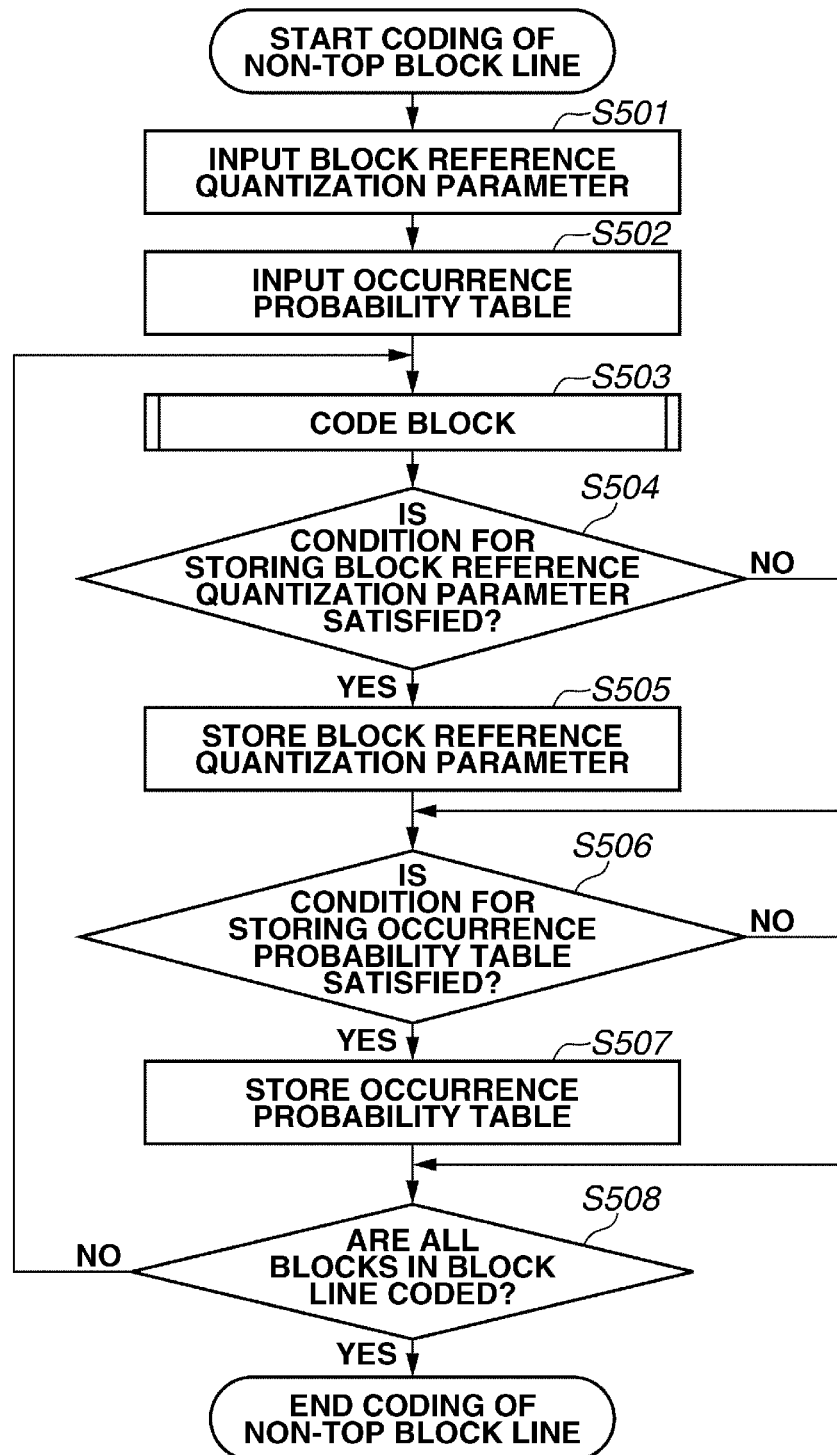
FIG. 5 is a flowchart illustrating processing for coding a block line other than the top block line by the image coding apparatus according to the first exemplary embodiment.
Figure 6:
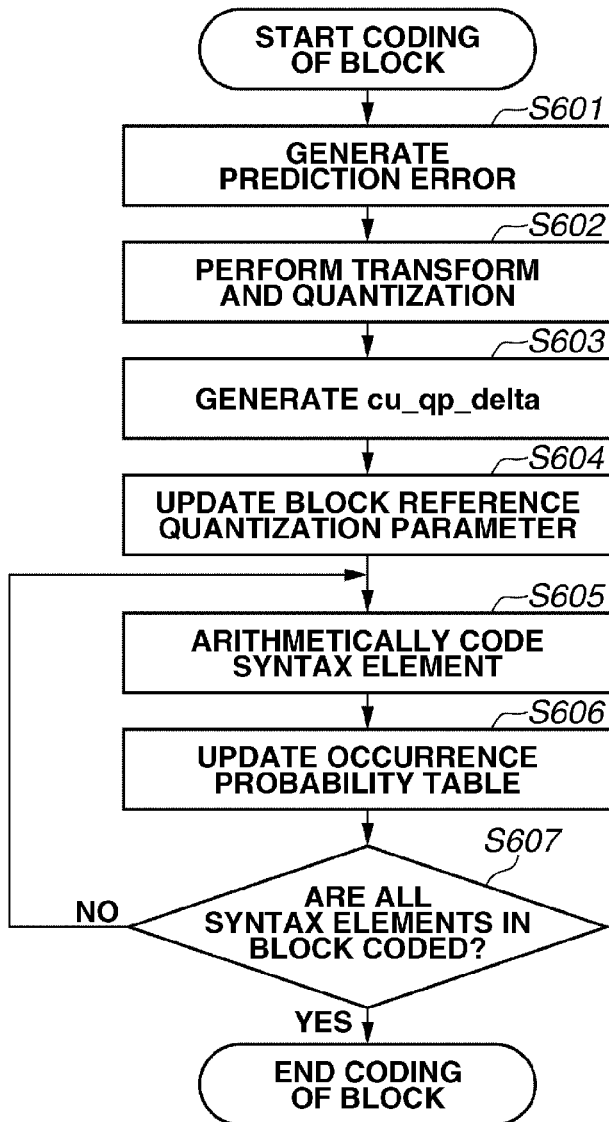
FIG. 6 is a flowchart illustrating processing for coding a block by the image coding apparatus according to the first exemplary embodiment.

The processing of step S303 (the processing for coding a block line other than the top block line) will be described in detail with reference to the flowchart illustrated in FIG. 5. The selector 101 determines for each block line whether the block line is an even-numbered block line. If the block line is an even-numbered block line, an image of the processing target block line is input into the first coding unit 102 and is coded by the first coding unit 102. If the block line is an odd-numbered block line, an image of the processing target block line is input into the second coding unit 103, and is coded by the second coding unit 103. First, a flow when the second coding unit 103 codes an odd-numbered block line will be described.

First, in step S501, the first quantization parameter is input from the first quantization parameter storage unit 105 as a block reference quantization parameter. Next, in step S502, the first occurrence probability table is input from the first occurrence probability table storage unit 104 as a block line reference occurrence probability table.

The processing of steps S503, S504, S506, and S508 is similar to the processing of steps S403, S404, S406, and S408, and, therefore, the description thereof is omitted here.

In step S505, the block reference quantization parameter is stored in the second quantization parameter storage unit 107 as a second quantization parameter. The second quantization parameter will be used as a block reference quantization parameter for a leftmost block in a next block line.

In step S507, the occurrence probability table is stored in the second occurrence probability table storage unit 106 as a second occurrence probability table. The second occurrence probability table will be used as a block line reference occurrence probability table when the leftmost block in the next block line is arithmetically coded.

Next, a flow when the first coding unit 102 codes an even-numbered block line will be described.

First, in step S501, the second quantization parameter is input from the second quantization parameter storage unit 107 as a block reference quantization parameter. Next, in step S502, the second occurrence probability table is input from the second occurrence probability table storage unit 106 as a block line reference occurrence probability table.

The processing of steps S503 to S508 is similar to the processing of steps S403 to S408, and, therefore, the description thereof is omitted here.

Figure 7A:
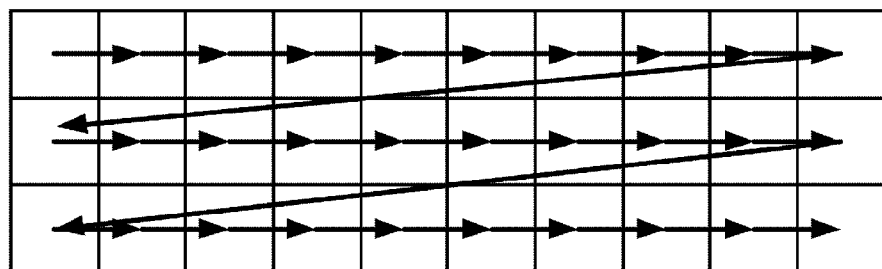
FIG. 7A illustrates a transfer of a quantization parameter by the conventional image coding apparatus.
Figure 7B:
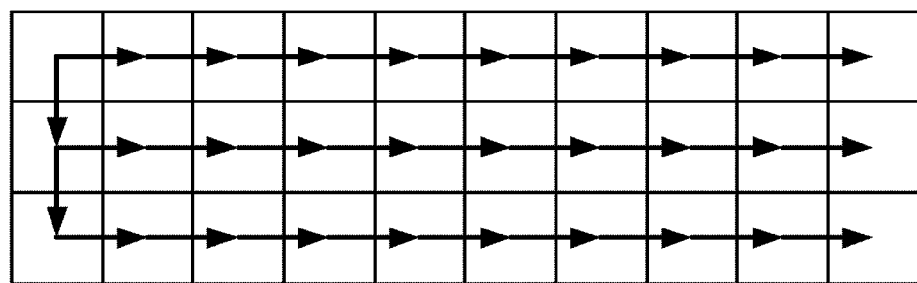
FIG. 7B illustrates a transfer of a quantization parameter by the image coding apparatus according to the first exemplary embodiment.

The above-described configuration and operation enable parallel encoding by allowing reference to the reference quantization parameter in addition to the occurrence probability table during processing of a leftmost block even before the completion of processing of a block line immediately before the block line being coded. FIGS. 7A and 7B each illustrate how the block reference quantization parameter is referred to. According to the conventional technique, as illustrated in FIG. 7A, until processing of a preceding block line is completed, processing of a next block line cannot start. However, according to the present exemplary embodiment, by making the reference to a spatially upper block possible when a leftmost block is processed, which eventually allows a reference pattern as illustrated in FIG. 7B, it becomes unnecessary to wait for the completion of the preceding block line processing.

Further, in the present exemplary embodiment, a quantization parameter used at a leftmost block in an immediately upper block line is used as a block reference quantization parameter when a leftmost block is coded. However, the present invention is not limited thereto, and may be embodied by any configuration capable of improving parallelism of processing block line by block line. For example, an initial value of a quantization parameter provided to a slice may be used as a block reference quantization parameter when leftmost blocks in all block lines are coded. As another possible configuration, a block reference quantization parameter may be the same as the condition for storing the occurrence probability table provided in steps S406 and S506. More specifically, a quantization parameter when a predetermined number-th block from a leftmost block in a block line is coded may be used as a block reference quantization parameter for a leftmost block in a next block line. Further, the image coding apparatus may be configured to switch a block referred to as a block reference quantization parameter based on a coding mode of a leftmost block.

Further, in the present exemplary embodiment, arithmetic coding is used for entropy coding, but the present invention is not limited thereto. Any coding may be employed, as long as, at the time of entropy coding based on statistical information such as the occurrence probability table, the statistical information in the middle of coding of a block line is used to perform entropy coding of a leftmost block of a next block line.

The present exemplary embodiment has been described based on an example using two coding units. However, it is apparent that the addition of, for example, a third coding unit, a third occurrence probability table storage unit, and a third quantization parameter storage unit enables parallel processing by a larger number of coding units.

Figure 8:
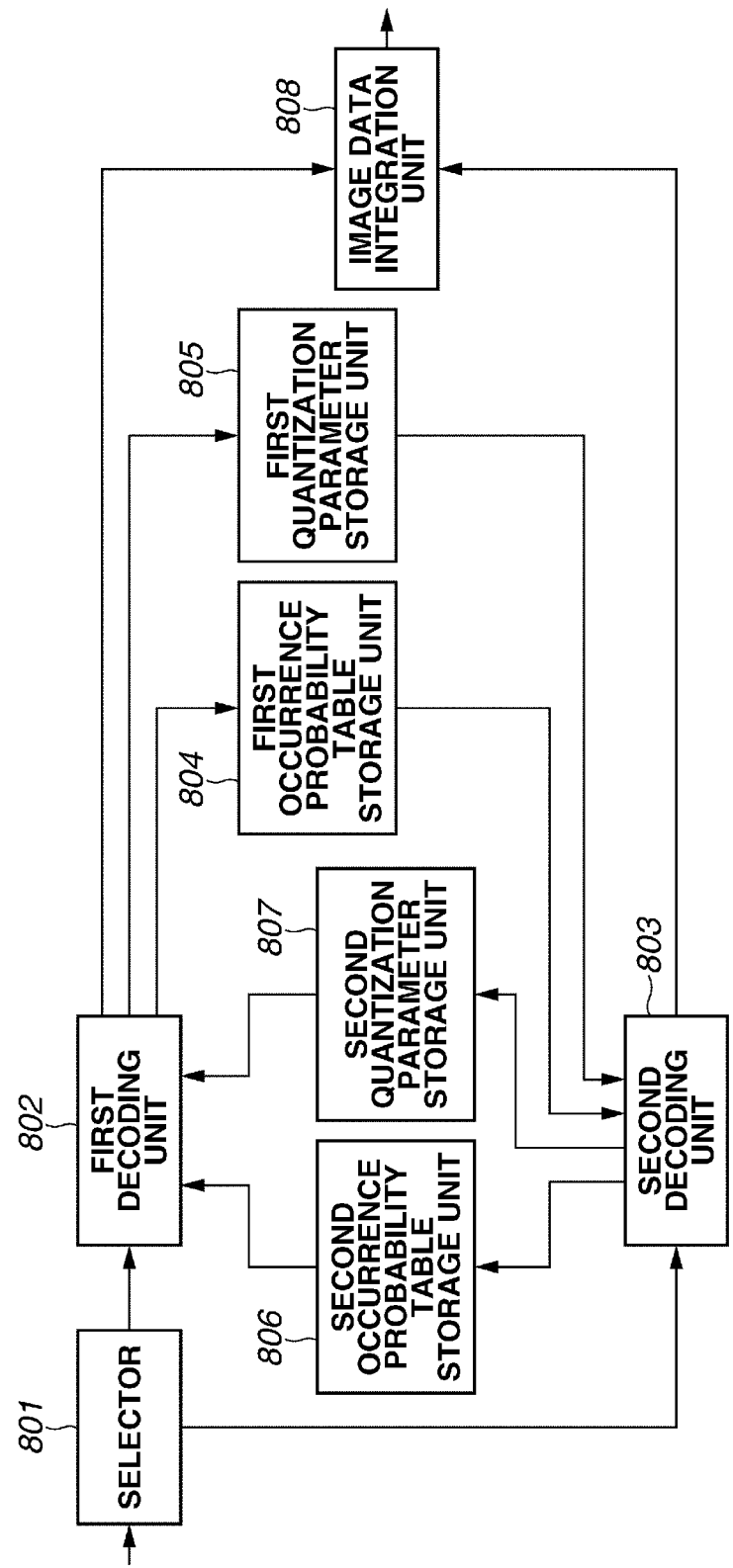
FIG. 8 is a block diagram illustrating a configuration of an image decoding apparatus according to a second exemplary embodiment.

FIG. 8 is a block diagram illustrating an image decoding apparatus according to a second exemplary embodiment.

Referring to FIG. 8, a selector 801 determines whether a processing target block belongs to an even-numbered block line. The selector 801 outputs the above-described bit stream to a first decoding unit 802 if the processing target block belongs to an even-numbered block line, and otherwise outputs the above-described bit stream to a second decoding unit 803.

The decoding units 802 and 803 decode the input bit stream, block line by block line as illustrated in FIG. 2. The present exemplary embodiment will be described based on an example using two decoding units, but the present invention is not limited thereto. Referring to FIG. 2, the blocks in the white areas, which indicate even-numbered block lines including the top block line (the 0-th block line), are decoded by the first decoding unit 802. The blocks in the shaded areas, which indicate odd-numbered block lines, are decoded by the second decoding unit 803.

Each of the first and second decoding units 802 and 803 first selects an occurrence probability table for binary signals of a bit stream to be decoded, and arithmetically decodes the binary signals based on the occurrence probability table to generate quantization coefficients. Next, each of the first and second decoding units 802 and 803 inversely quantizes the quantization coefficients based on a quantization parameter to generate transform coefficients. Then, each of the first and second decoding units 802 and 803 performs inverse orthogonal transform on the transform coefficients to generate prediction errors. Next, each of the first and second decoding units 802 and 803 performs the prediction by referring to pixels surrounding the decoding target block or to another frame to generate image data of the decoding target block. A first occurrence probability table storage unit 804 stores the occurrence probability table generated by the first decoding unit 802. A first quantization parameter storage unit 805 stores the quantization parameter determined by the first decoding unit 802.

A second occurrence probability table storage unit 806 stores the occurrence probability table generated by the second decoding unit 803. A second quantization parameter storage unit 807 stores the quantization parameter determined by the second decoding unit 803. An image data integration unit 808 shapes the image data generated by the first decoding unit 802 and the image data generated by the second decoding unit 803, and outputs the shaped image data.

An operation of the image decoding apparatus according to the present exemplary embodiment will be described in detail with reference to the flowcharts illustrated in FIGS. 9 to 12. In the present exemplary embodiment, a bit stream is input frame by frame. The bit stream is divided into coded data pieces and then is decoded. The present exemplary embodiment is configured in such a manner that a bit stream is input frame by frame, but may be configured in such a manner that a frame is divided into slices, and a bit stream is input slice by slice. Further, for simplification of the description, the present exemplary embodiment will be described based on intra prediction decoding processing only, but is not limited thereto. The present exemplary embodiment can be also employed to inter prediction decoding processing.

First, in step S901, the image decoding apparatus determines whether a processing target block belongs to a top block line. If the processing target block belongs to the top block line (YES in step S901), the processing proceeds to step S902. If the processing target block does not belong to the top block line (NO in step S901), the processing proceeds to step S903.

The processing of step S902 is processing for decoding the top block line, the details of which will be described below. The processing of step S903 is processing for decoding a block line other than the top block line, the details of which will be also described below. Further, the selector 801 determines whether the block line to which the processing target block belongs is an even-numbered block line or an odd-numbered block line. If the block line is an even-numbered block line, the processing target block is decoded by the first decoding unit 802 independently. If the block line is not an even-numbered block line, the processing target block is decoded by the second decoding unit 803 independently. In the present exemplary embodiment, the selector 801 determines whether a block line is an even-numbered block line based on the number of decoded blocks. However, the present invention is not limited thereto. For example, an input bit stream may include an identifier, which is provided at a boundary between block lines in advance, and the selector 801 may determine whether a block line is an even-numbered block line based on the identifier. Alternatively, information indicating a size of a bit stream of each block line or a starting position of a next block line may be provided, and the selector 801 may determine whether a block line is an even-numbered block line based on this information.

Next, in step S904, the image data integration unit 808 integrates image data output from the first decoding unit 802 and image data output from the second decoding unit 803, and generates and outputs a decoded image.

Next, in step S905, the image decoding apparatus determines whether all block lines in the processing target frame are decoded. If all block lines are decoded (YES in step S905), the processing for decoding one frame is ended. If not all blocks are decoded (NO in step S905), the processing proceeds to step S901 again, from which the next block line is decoded.

The processing of step S902 (the processing for decoding the top block line) will be described in detail with reference to the flowchart illustrated in FIG. 10. Since the top block line is an even-numbered block line, coded data of the processing target block line is input into the first decoding unit 802 by the selector 801, and is decoded by the first decoding unit 802.

Figure 10:
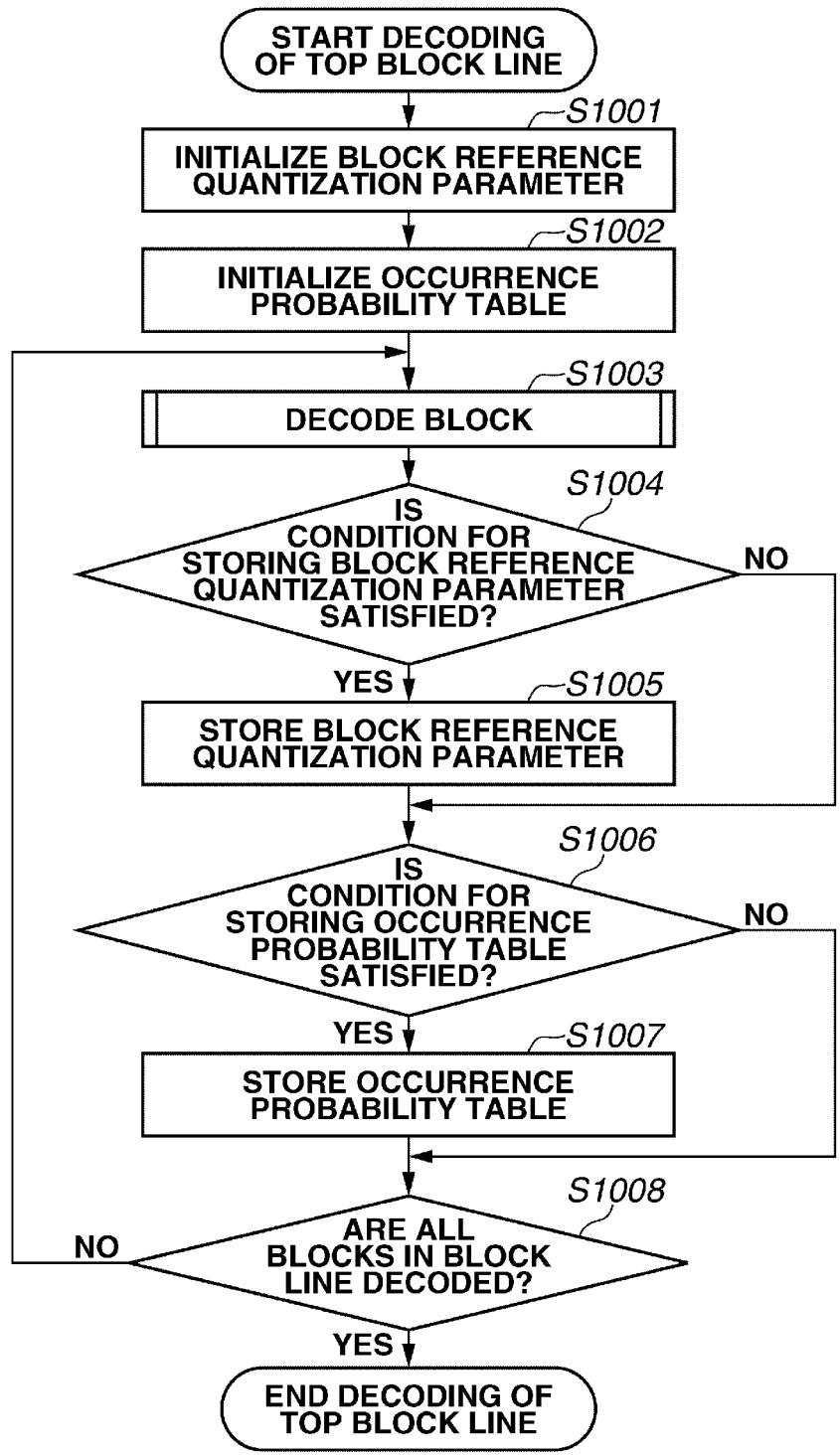
FIG. 10 is a flowchart illustrating processing for decoding a top block line by the image decoding apparatus according to the second exemplary embodiment.

Referring to FIG. 10, first, in step S1001, a quantization parameter, based on which a block is decoded, is initialized so as to match an initial value of a quantization parameter for a slice. Hereinafter, the quantization parameter, based on which a block is decoded, will be referred to as a "block reference quantization parameter" in a similar manner to the image coding apparatus according to the first exemplary embodiment. The block quantization parameter when a decoding target block is inversely quantized is in such a state that the value itself is not coded but a difference value thereof from the block reference quantization parameter is coded as a syntax element. Therefore, at the time of decoding, the block quantization parameter should be generated by adding the block reference quantization parameter and the above-described difference value, and the decoding apparatus should perform inverse quantization using the generated block quantization parameter. In the present exemplary embodiment, this difference value corresponds to a cu_qp_delta value in the HEVC method. However, the present invention is not limited thereto. For example, the difference value may correspond to an mb_qp_delta value in the H.264 method. Next, in step S1002, an occurrence probability table is initialized by a predetermined method. The initialized occurrence probability table is used to arithmetically decode the first binary signal of the leftmost block in the block line, and is updated as necessary in step S1003, which will be described below. Hereinafter, the occurrence probability table used to arithmetically decode a first binary signal of an initial block in a block line will be referred to as a "block line reference occurrence probability table", in a similar manner to the image coding apparatus according to the first exemplary embodiment.

Next, in step S1003, the first decoding unit 802 decodes the bit stream block by block to generate image data.

In the present exemplary embodiment, one block is constituted by 64×64 pixels, but the present invention is not limited thereto. The size of a block may be a smaller size such as 32×32 pixels, or a larger size such 128×128 pixels. The block decoding processing in step S1003 will be described in detail with reference to the flowchart illustrated in FIG. 12.

First, in step S1201, the first decoding unit 802 arithmetically decodes the bit stream based on the above-described occurrence probability table to generate a binary signal. Further, the first decoding unit 802 decodes the binary signal binarized according any of various kinds of binarization methods, such as unary binarization and fixed-length binarization, for each syntax element in a similar manner to the H.264 method to generates syntax elements including quantization coefficients.

Next, in step S1202, the occurrence probability table is updated based on whether the arithmetically decoded binary signal is the most probable symbol.

Next, in step S1203, the first decoding unit 802 determines whether all syntax elements in the block are arithmetically decoded. If all syntax elements are arithmetically decoded (YES in step S1203), the processing proceeds to step S1204. If not all syntax elements are arithmetically decoded (NO in step S1203), the processing proceeds to step S1201 again.

Next, in step S1204, the first decoding unit 802 generates a block quantization parameter by adding the above-described block reference quantization parameter and the cu_qp_delta value decoded in step S1201.

Next, in step S1205, the first decoding unit 802 inversely quantizes the quantization coefficients based on the block quantization parameter to generate transform coefficients. Then, the first decoding unit 802 performs inverse orthogonal transform on the transform coefficients to generate prediction errors.

Next, in step S1206, the first decoding unit 802 sets the block quantization parameter used when inversely quantizing the processing target block to the block reference quantization parameter, thereby updating the block reference quantization parameter. The block reference quantization parameter will be used to generate a block quantization parameter of a next block.

Next, in step S1207, the first decoding unit 802 performs intra prediction from pixels surrounding the processing target block to generate a prediction image. Further, the first decoding unit 802 generates image data corresponding to one block by adding the prediction errors and the prediction image.

Referring back to the flowchart illustrated in FIG. 10, in step S1004, the first decoding unit 802 determines whether a condition for storing the block reference quantization parameter is satisfied. In the present exemplary embodiment, the condition for storing the block reference quantization parameter is whether the block decoded in step S1003 is the leftmost block in the block line. If the condition is satisfied (YES in step S1004), the processing proceeds to step S1005. In step S1005, the block reference quantization parameter is stored in the first quantization parameter storage unit 805 as a first quantization parameter. If the condition is not satisfied (NO in step S1004), the processing proceeds to step S1006. The first quantization parameter will be used as a block reference quantization parameter when the second decoding unit 803 decodes the leftmost block in the next block line.

Next, in step S1006, the first decoding unit 802 determines whether a condition for storing the occurrence probability table is satisfied. In the present exemplary embodiment, the condition for storing the occurrence probability table is whether the block decoded in step S1003 is the predetermined number-th block from the leftmost block in the block line. If this condition is satisfied (YES in step S1006), the processing proceeds to step S1007. In step S1007, the occurrence probability table is stored in the first occurrence probability table storage unit 804 as a first occurrence probability table. If the condition is not satisfied (NO in step S1006), the processing proceeds to step S1008. The first occurrence probability table will be used as a block line reference occurrence probability table when the second decoding unit 803 decodes the leftmost block in the next block line.

Next, in step S1008, the first decoding unit 802 determines whether all blocks in the processing target block line are decoded. If all blocks are decoded (YES in step S1008), decoding the top block line is ended. If not all blocks are decoded (NO in step S1008), the processing proceeds to step S1003 again, from which the first decoding unit 802 decodes the next block in raster order.

Figure 11:
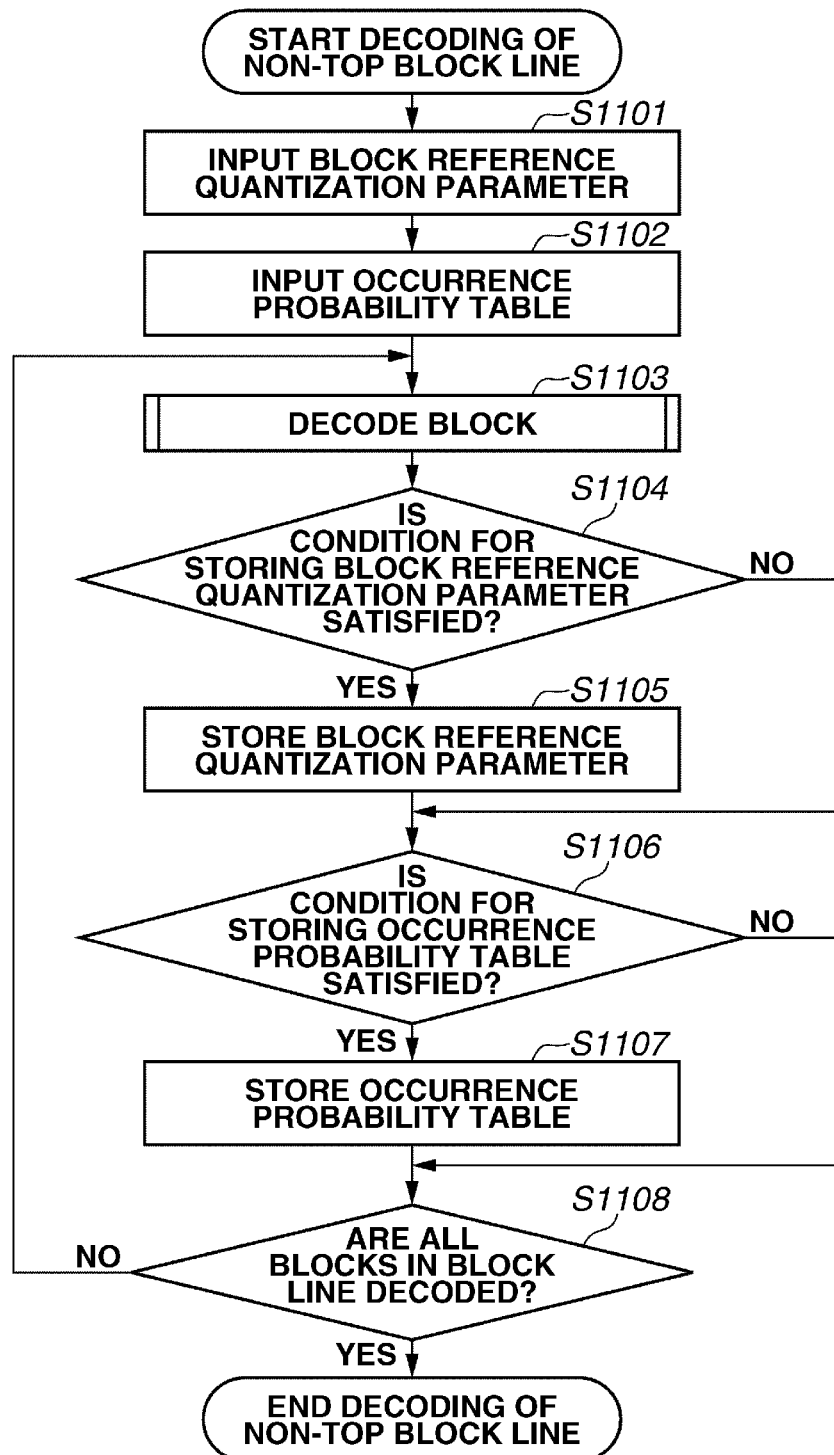
FIG. 11 is a flowchart illustrating processing for decoding a block line other than the top block line by the image decoding apparatus according to the second exemplary embodiment.
Figure 12:
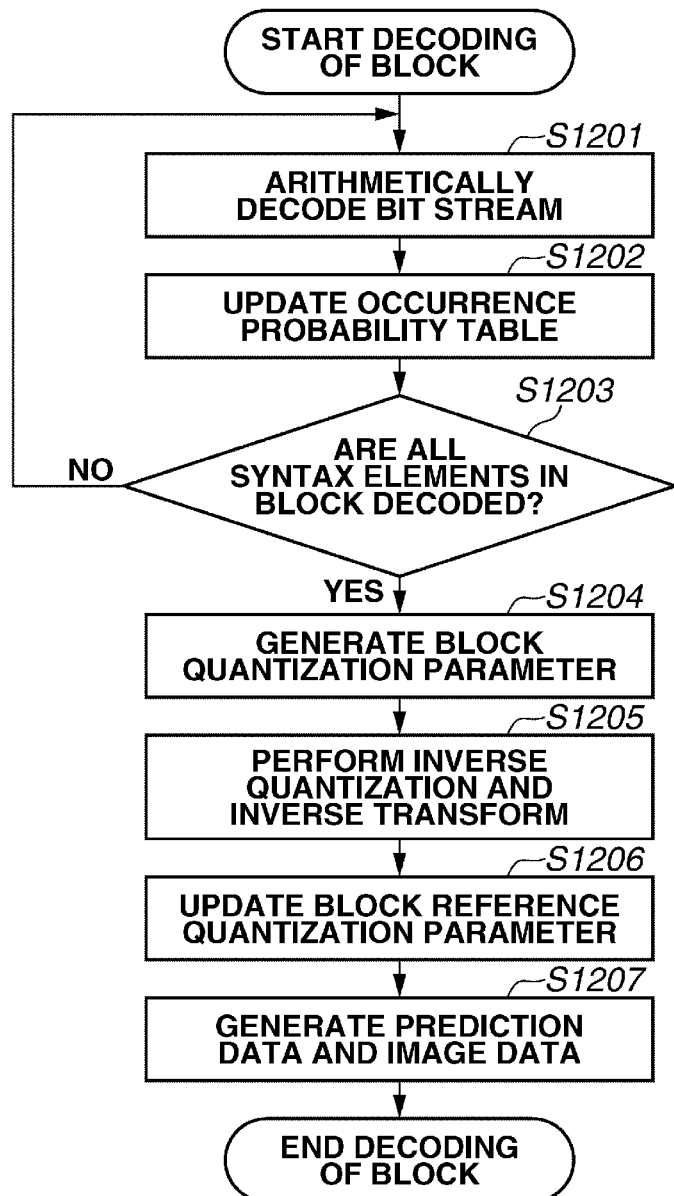
FIG. 12 is a flowchart illustrating processing for decoding a block by the image decoding apparatus according to the second exemplary embodiment.

The processing of step S903 (the processing for decoding a block line other than the top block line) will be described in detail with reference to the flowchart illustrated in FIG. 11. The selector 801 determines for each block line whether the block line is an even-numbered block line. If the block line is an even-numbered block line, the bit stream of the processing target block is input into the first decoding unit 802, and is decoded by the first decoding unit 802. If the block line is an odd-numbered block line, the bit stream of the processing target block is input into the second decoding unit 803, and is decoded by the second decoding unit 803. First, a flow when the second decoding unit 803 decodes an odd-numbered block line will be described.

First, in step S1101, the first quantization parameter is input from the first quantization parameter storage unit 805 as a block reference quantization parameter. Next, in step S1102, the first occurrence probability table is input from the first occurrence probability table storage unit 804 as a block line reference occurrence probability table.

The processing of steps S1103, S1104, S1106, and S1108 is similar to the processing of steps S1003, S1004, S1006, and S1008, and, therefore, the description thereof is omitted here.

In step S1105, the block reference quantization parameter is stored in the second quantization parameter storage unit 807 as a second quantization parameter. The second quantization parameter will be used as a block reference quantization parameter for the leftmost block in the next block line.

In step S1107, the occurrence probability table is stored in the second occurrence probability table storage unit 806 as a second occurrence probability table. The second occurrence probability table will be used as a block line reference occurrence probability table when the first decoding unit 802 arithmetically decodes the leftmost block in the next block line.

Subsequently, a flow when the first decoding unit 802 decodes an even-numbered block line will be described.

First, in step S1101, the second quantization parameter is input from the second quantization parameter storage unit 807 as a block reference quantization parameter. Next, in step S1102, the second occurrence probability table is input from the second occurrence probability table storage unit 806 as a block line reference occurrence probability table.

The processing of steps S1103 to S1108 is similar to the processing of steps S1003 to S1008, and, therefore, the description thereof is omitted here.

The above-described configuration and operation enable parallel execution of decoding by allowing reference to a block reference quantization parameter in addition to an occurrence probability table, which is statistical information, during processing of a leftmost block even before completion of processing of a block line immediately before the block line that is currently being decoded. FIGS. 7A and 7B each illustrate how a block reference quantization parameter is referred to. According to the conventional technique, as illustrated in FIG. 7A, until processing of a preceding block line is completed, processing of a next block line cannot start. However, according to the present exemplary embodiment, a spatially upper block can be referred to when a leftmost block is processed, which allows a reference pattern as illustrated in FIG. 7B, thereby eliminating the necessity of waiting for completion of processing of a preceding block line.

Further, in the present exemplary embodiment, a quantization parameter used at a leftmost block in an immediately upper block line is used as a block reference quantization parameter when a leftmost block is decoded. However, the present invention is not limited thereto, and may be embodied by any configuration capable of improving parallelism of processing block line by block line. For example, an initial value of a quantization parameter provided to a slice may be used as a block reference quantization parameter when leftmost blocks in all block lines are decoded. As another possible configuration, the condition for storing a block reference quantization parameter may be the same as the condition for storing the occurrence probability table provided in steps S1006 and S1106. More specifically, a quantization parameter when a predetermined number-th block from a leftmost block in a block line is decoded may be used as a block reference quantization parameter for the leftmost block in the next block line. Further, the image decoding apparatus may be configured to switch a block referred to as a block reference quantization parameter based on a coding mode of a leftmost block.

Further, in the present exemplary embodiment, arithmetic decoding is used for entropy decoding, but the present invention is not limited thereto. Any decoding may be employed, as long as, at the time of entropy decoding based on statistical information such as the occurrence probability table, the statistical information in the middle of decoding of a block line is used to perform entropy decoding of the leftmost block of the next block line.

The present exemplary embodiment has been described based on an example using two decoding units. However, it is apparent that the addition of, for example, a third decoding unit, a third occurrence probability table storage unit, and a third quantization parameter storage unit enables parallel processing by a larger number of decoding units.

Figure 14:
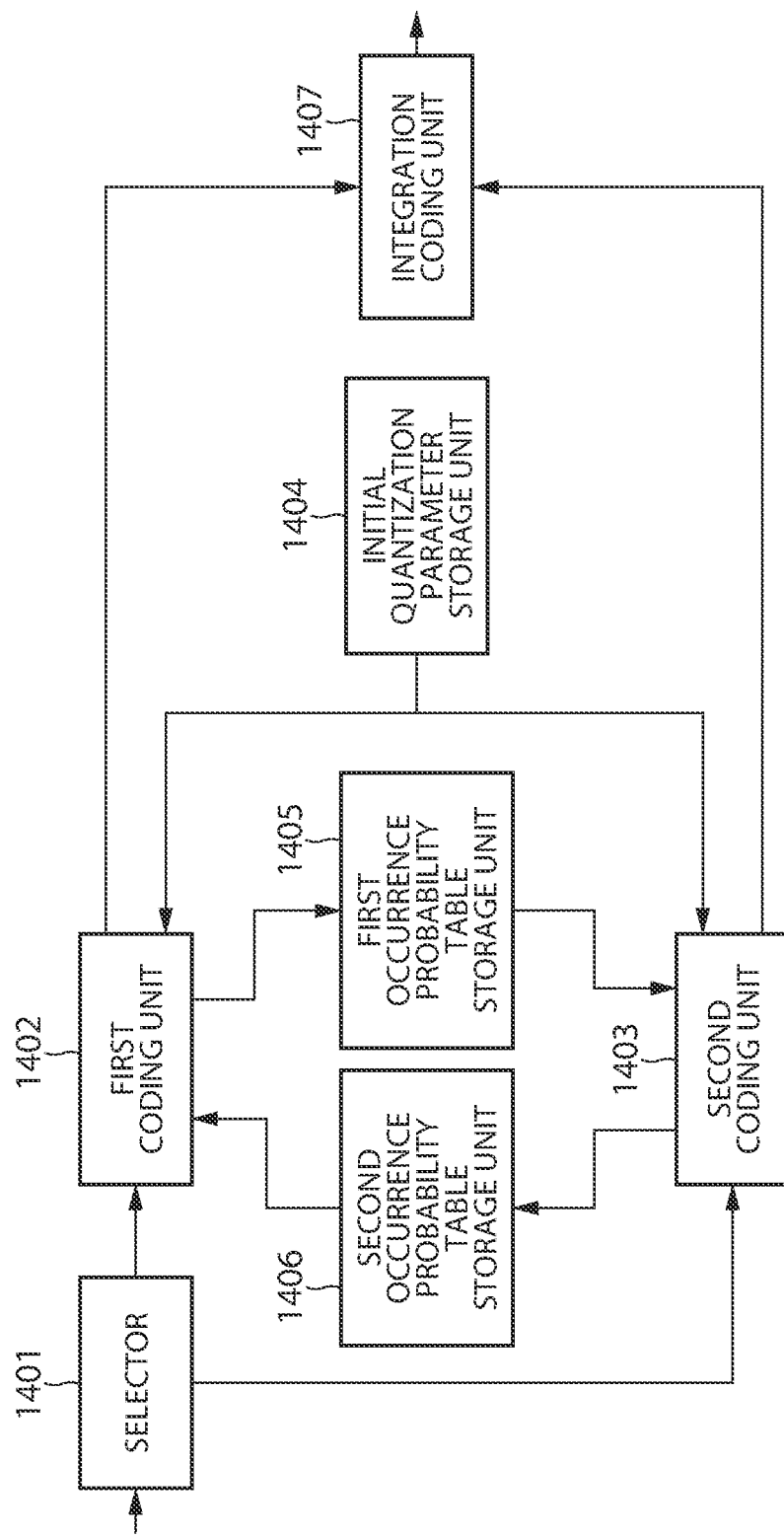
FIG. 14 is a block diagram illustrating a configuration of an image coding apparatus according to a third exemplary embodiment.

FIG. 14 is a block diagram illustrating an image coding apparatus according to a third exemplary embodiment.

Referring to FIG. 14, a selector 1401 determines whether a processing target block belongs to an even-numbered block line. The selector 1401 outputs the block to a first coding unit 1402 if the block belongs to an even-numbered block line, and otherwise outputs the block to a second coding unit 1403.

The first and second coding units 1402 and 1403 code blocks, into which an input image is divided by n×n pixels ("n" is a positive integer of 2 or larger), line by line as illustrated in FIG. 2 The present exemplary embodiment will be described based on an example using two coding units, but the present invention is not limited thereto. Referring to FIG. 2, the section 201 indicated as the square drawn by the thin line represents a block, and the section 202 indicated as the rectangle drawn by the thick line represents a block line. Further, the blocks in the white areas, which indicate even-numbered block lines including the top block line (the 0-th block line), are coded by the first coding unit 1402. The blocks in the shaded areas, which indicate odd-numbered block lines, are coded by the second coding unit 1403.

Each of the first and second coding units 1402 and 1403 first generates prediction errors according to the prediction by referring to pixels surrounding a coding target block or another frame, and performs orthogonal transform to generate transform coefficients. Next, each of the first and second coding units 1402 and 1403 determines a quantization parameter for the orthogonally transformed transform coefficients, and quantizes each transform coefficient to generate quantization coefficients. Next, each of the first and second coding units 1402 and 1403 binarizes each syntax element including the quantization coefficients to generate binary signals. An occurrence probability is assigned to each syntax element in advance as a table (hereinafter referred to as an "occurrence probability table"). The binary signals are arithmetically coded based on the above-described occurrence probability table. Then, each time a binary signal is coded, the occurrence probability table is updated using statistical information indicating whether the coded binary signal is the most probable symbol.

An initial quantization parameter storage unit 1404 stores an initial value of a quantization parameter.

A first occurrence probability table storage unit 1405 stores the occurrence probability table generated by the first coding unit 1402. Hereinafter, the occurrence probability table stored in the first occurrence probability table storage unit 1405 will be referred to as a "first occurrence probability table".

A second occurrence probability table storage unit 1406 stores the occurrence probability table generated by the second coding unit 1403. Hereinafter, the occurrence probability table stored in the second occurrence probability table storage unit 1406 will be referred to as a "second occurrence probability table".

An integration coding unit 1407 integrates coded data generated by the first coding unit 1402 and coded data generated by the second coding unit 1403, and outputs the integrated data as a bit stream.

An operation of the image coding apparatus according to the present exemplary embodiment will be described in detail with reference to the flowcharts illustrated in FIGS. 3, 15, and 16. In the present exemplary embodiment, moving image data is input frame by frame, is divided into blocks, and is processed in raster order. The present exemplary embodiment is configured to input moving image data frame by frame, but may be configured to input still image data corresponding to one frame or to input image data slice by slice, which a frame is divided into. Further, for simplification of description, the present exemplary embodiment will be described based on only intra prediction coding processing, but is not limited thereto. The present exemplary embodiment can be also employed to inter prediction coding processing.

Figure 3:
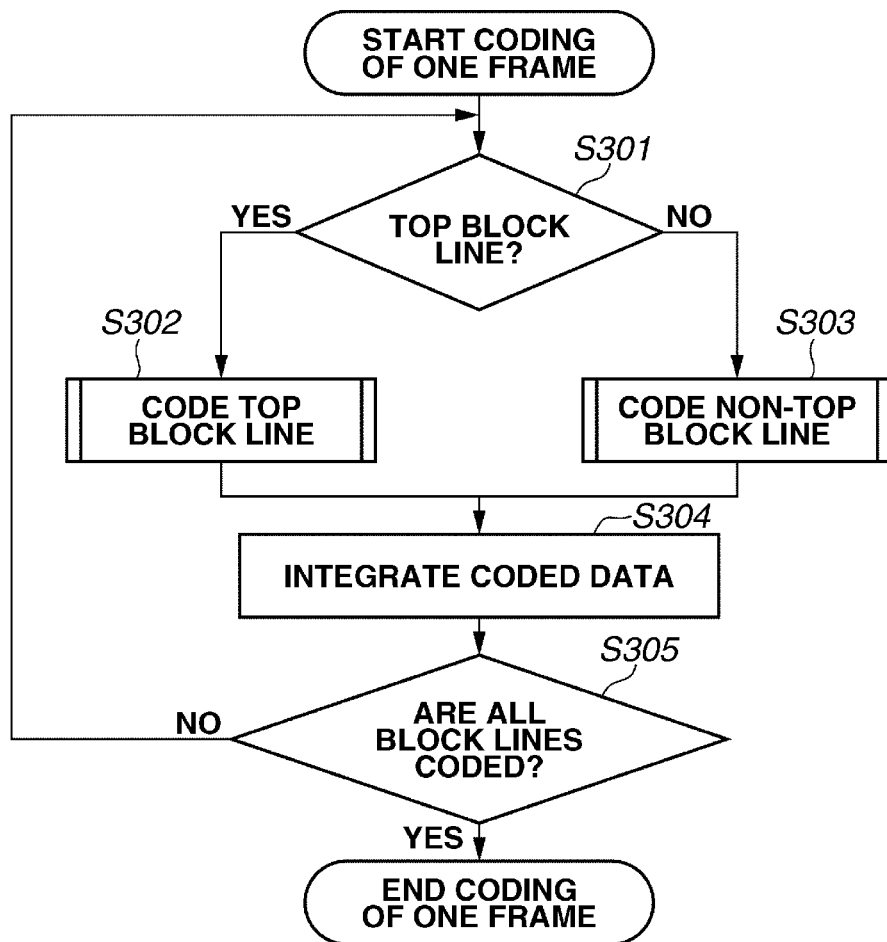
FIG. 3 is a flowchart illustrating processing for coding a frame by the image coding apparatus according to the first exemplary embodiment.

First, the processing of steps S301, S304, and S305 illustrated in FIG. 3 is the same as the first exemplary embodiment, and, therefore, the description thereof is omitted here.

Then, the processing of step S302 (the processing for coding the top block line) will be described in detail with reference to the flowchart illustrated in FIG. 15. Since the top block line is an even-numbered block line, a processing target block is input into the first coding unit 1402 by the selector 1401, and is coded by the first coding unit 1402.

First, in step S1501, a quantization parameter, based on which a block is coded, is initialized so as to match an initial value of a quantization parameter for a slice, and is stored in the initial quantization parameter storage unit 1404. Hereinafter, the quantization parameter, based on which a block is coded, will be referred to as a "block reference quantization parameter" in a similar manner to the first exemplary embodiment. Regarding a quantization parameter used to quantize a coding target block, the value thereof itself is not coded as a syntax element, but a difference value thereof from the block reference quantization parameter is coded.

Next, in step S1502, the first coding unit 1402 reads the initialized quantization parameter from the initial quantization parameter storage unit 1404 as a block reference quantization parameter for coding a leftmost block in a block line. Next, the processing of steps S1503 to S1507 is similar to the processing of steps S402, S403, and S406 to S408 illustrated in FIG. 4, respectively, and, therefore, the description thereof is omitted here.

However, in step S1504, the first coding unit 1402 codes pixel data block by block.

Next, the processing of step S303 (the processing for coding a block line other than the top block line) will be described in detail with reference to the flowchart illustrated in FIG. 16. The selector 1401 determines for each block line whether the block line is an even-numbered block line. If the block line is an even-numbered block line, an image of the processing target block line is input into the first coding unit 1402 and is coded by the first coding unit 1402. If the block line is an odd-numbered block line, an image of the processing target block line is input into the second coding unit 1403, and is coded by the second coding unit 1403. First, a flow when the second coding unit 1403 codes an odd-numbered block line will be described.

First, in step S1601, a block reference quantization parameter for coding a leftmost block in a block line is input from the initial quantization parameter storage unit 1404. Next, in step S1602, the first occurrence probability table is input from the first occurrence probability table storage unit 1405 as a block line reference occurrence probability table.

In step S1603, the second coding unit 1403 codes pixel data block by block. The processing of step S1604 is similar to the processing of step S1505 illustrated in FIG. 15.

In step S1605, the occurrence probability table is stored in the second occurrence probability table storage unit 1406 as a second occurrence probability table. The second occurrence probability table will be used as a block line reference occurrence probability table when the first coding unit 1402 arithmetically codes the leftmost block in the next block line.

Figure 15:
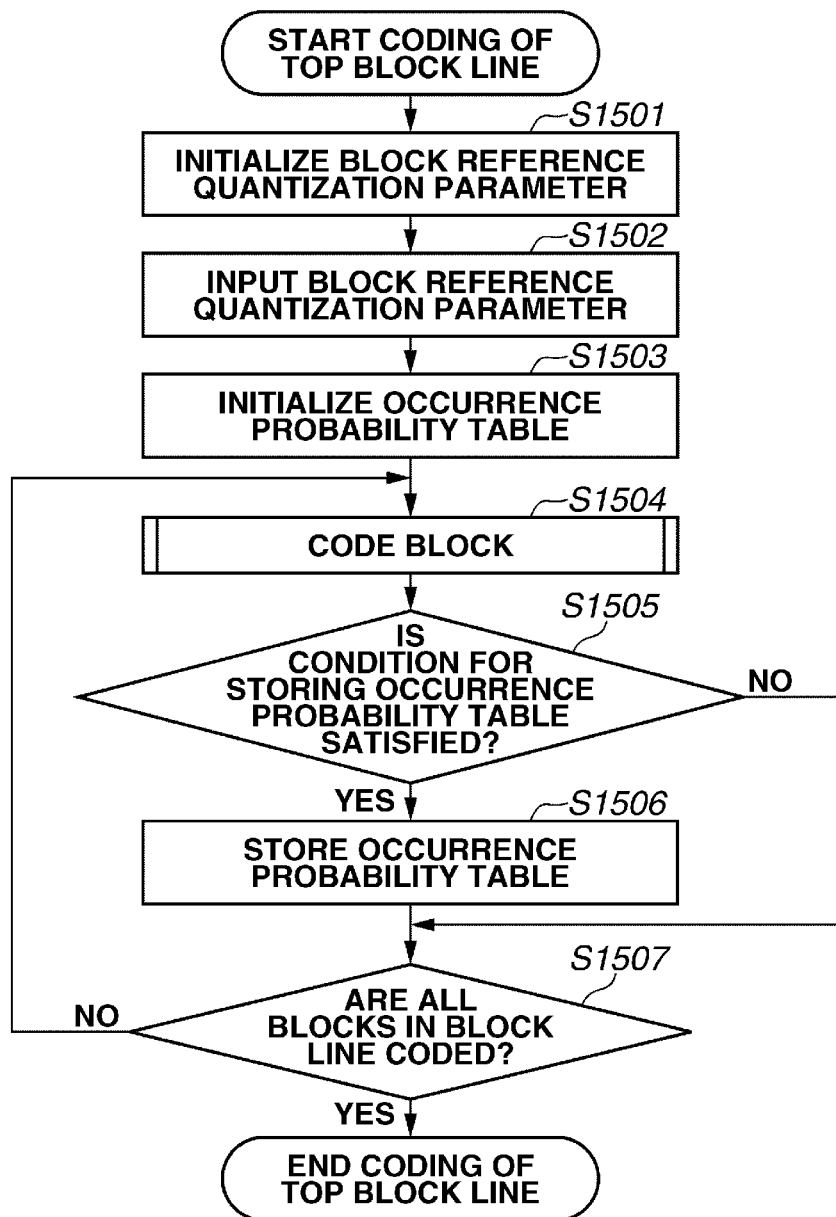
FIG. 15 is a flowchart illustrating processing for coding a top block line by the image coding apparatus according to the third exemplary embodiment.
Figure 16:
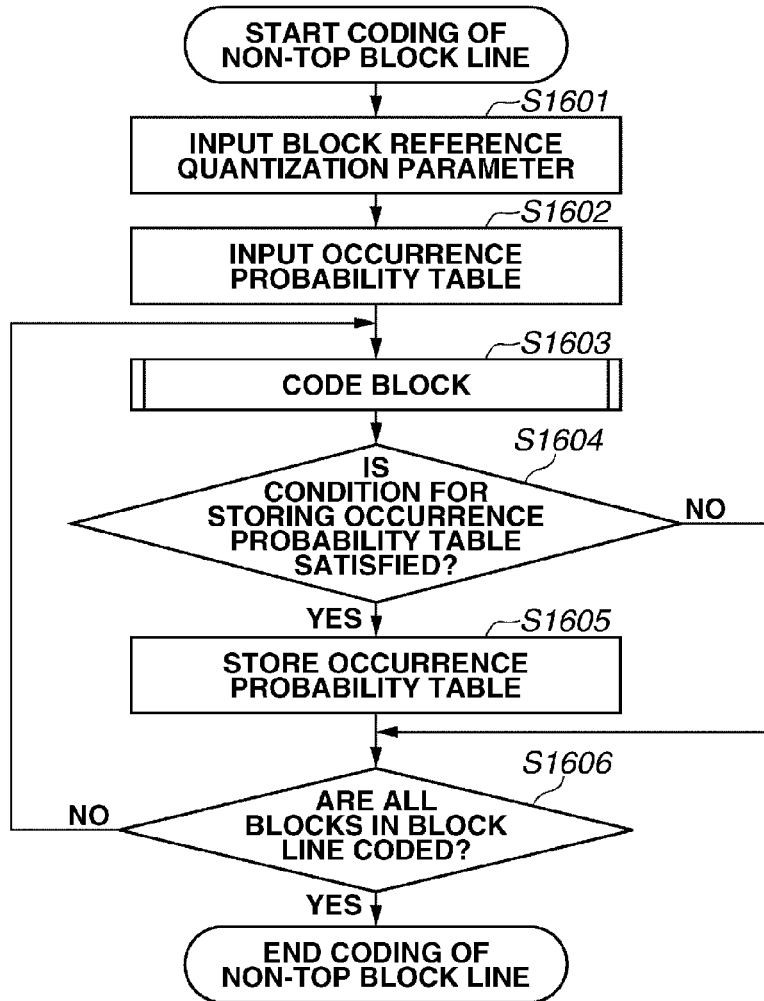
FIG. 16 is a flowchart illustrating processing for coding a block line other than the top block line by the image coding apparatus according to the third exemplary embodiment.

The processing of step S1606 is similar to the processing of step S1507 illustrated in FIG. 15.

Subsequently, a flow when the first coding unit 1402 codes an even-numbered block line will be described.

First, in step S1601, a block reference quantization parameter for coding the leftmost block in the block line is input from the initial quantization parameter storage unit 1404. Next, in step S1602, the second occurrence probability table is input from the second occurrence probability table storage unit 1406 as a block line reference occurrence probability table.

The processing of steps S1603 to S1606 are similar to the processing of steps S1504 to S1507, and, therefore, the description thereof is omitted here.

Figure 17A:
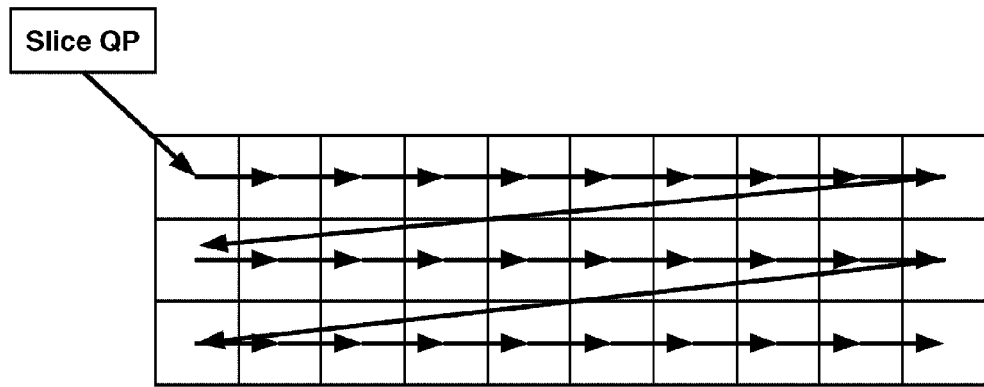
FIG. 17A illustrates a transfer of a quantization parameter by the image coding apparatus according to the third exemplary embodiment.
Figure 17B:
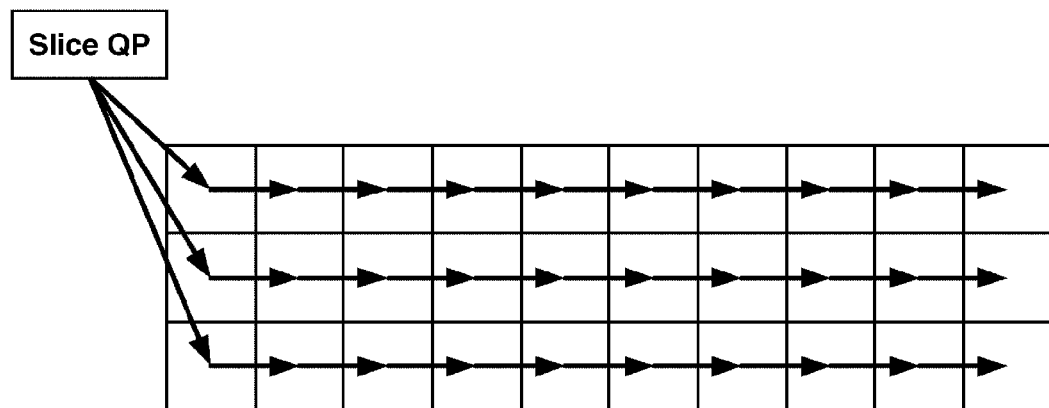
FIG. 17B illustrates a transfer of a quantization parameter by the image coding apparatus according to the third exemplary embodiment.

The above-described configuration and operation enable parallel execution of coding by allowing reference to a block reference quantization parameter in addition to an occurrence probability table, which is statistical information, during processing of a leftmost block even before completion of processing of a block line immediately before the block line that is currently being coded. FIGS. 17A and 17B each illustrate how a block reference quantization parameter is referred to. In FIGS. 17A and 17B, "SLICE QP" indicates an initial value of a quantization parameter provided to a slice. According to the conventional technique, as illustrated in FIG. 17A, until processing of a preceding block line is completed, processing of the next block line cannot start. However, according to the present exemplary embodiment, an initial value of a quantization parameter provided to a slice can be referred as a block reference quantization parameter for coding the leftmost block in the block line, thereby eliminating the necessity of waiting for completion of processing of the preceding block line as illustrated in FIG. 17B.

Further, in the present exemplary embodiment, arithmetic coding is used for entropy coding, but the present invention is not limited thereto. Any coding may be employed, as long as, at the time of entropy coding based on statistical information such as the occurrence probability table, the statistical information in the middle of coding of a block line is used to perform entropy coding of the leftmost block of the next block line.

The present exemplary embodiment has been described based on an example using two coding units. However, it is apparent that the addition of, for example, a third coding unit and a third occurrence probability table storage unit enables parallel processing by a larger number of coding units.

Figure 18:
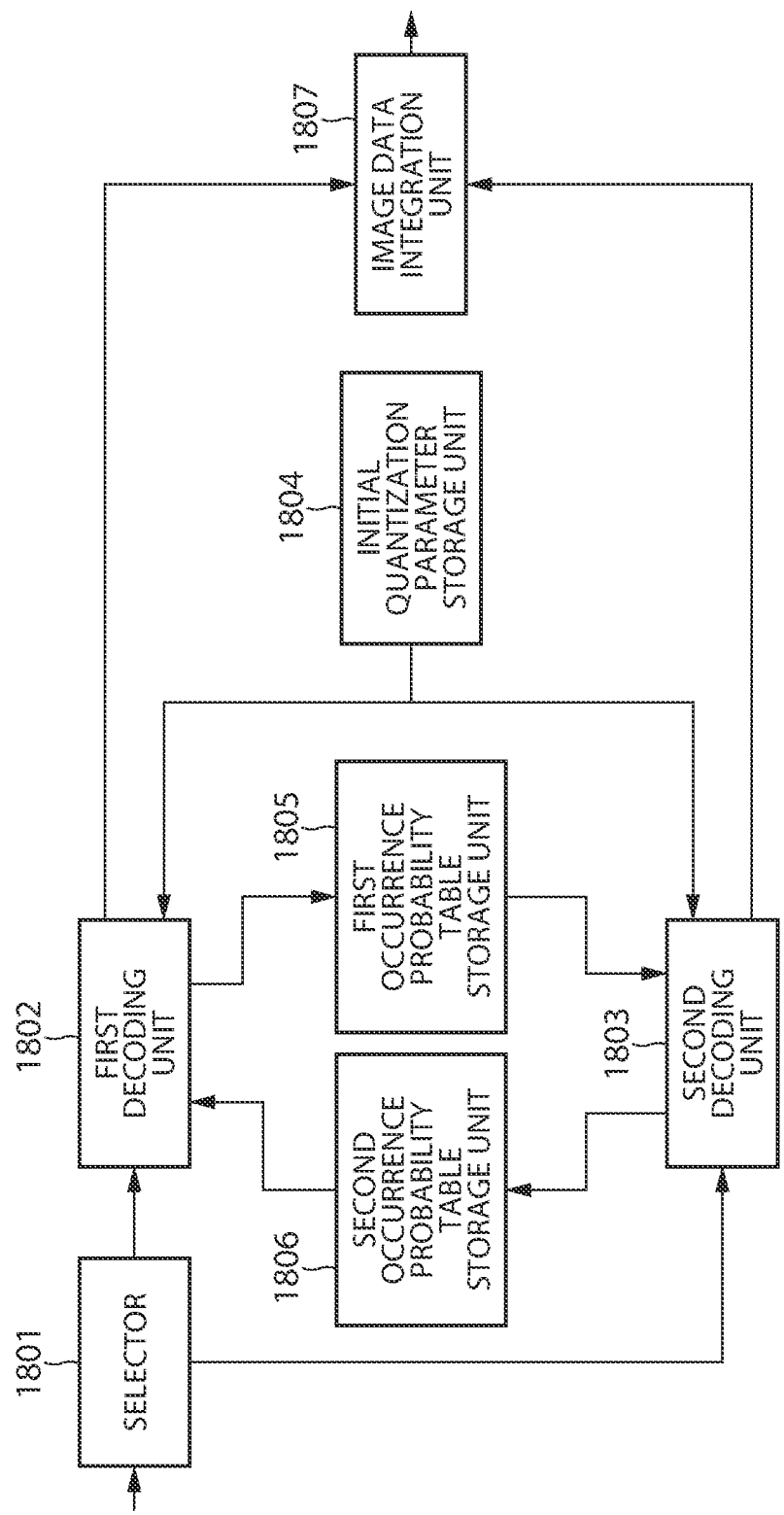
FIG. 18 is a block diagram illustrating a configuration of an image decoding apparatus according to a fourth exemplary embodiment.

FIG. 18 is a block diagram illustrating an image decoding apparatus according to a fourth exemplary embodiment.

Referring to FIG. 18, a selector 1801 determines whether a processing target block belongs to an even-numbered block line. The selector 1801 outputs the above-described bit stream to a first decoding unit 1802 if the processing target block belongs to an even-numbered block line, and otherwise outputs the above-described bit stream to a second decoding unit 1803.

The decoding units 1802 and 1803 decode the input bit stream, block line by block line as illustrated in FIG. 2. The present exemplary embodiment will be described based on an example using two decoding units, but the present invention is not limited thereto. Referring to FIG. 2, the blocks in the white areas, which indicate even-numbered block lines including the top block line (the 0-th block line), are decoded by the first decoding unit 1802. The blocks in the shaded areas, which indicate odd-numbered block lines, are decoded by the second decoding unit 1803.

Each of the first and second decoding units 1802 and 1803 first selects an occurrence probability table for binary signals of a bit stream that is a decoding target, and arithmetically decodes the binary signals based on the occurrence probability table to generate quantization coefficients. Next, each of the first and second decoding units 1802 and 1803 inversely quantizes the quantization coefficients based on a quantization parameter to generate transform coefficients. Then, each of the first and second decoding units 1802 and 1803 performs inverse orthogonal transform on the transform coefficients to generate prediction errors. Next, each of the first and second decoding units 1802 and 1803 performs motion compensation by referring to pixels surrounding the decoding target block or another frame to generate image data of the decoding target block. An initial quantization parameter storage unit 1804 stores an initial value of a quantization parameter. A first occurrence probability table storage unit 1805 stores the occurrence probability table generated by the first decoding unit 1802.

A second occurrence probability table storage unit 1806 stores the occurrence probability table generated by the second decoding unit 1803. An image data integration unit 1807 shapes image data generated by the first decoding unit 1802 and image data generated by the second decoding unit 1803, and outputs the shaped image data An operation of the image decoding apparatus according to the present exemplary embodiment will be described in detail with reference to the flowcharts illustrated in FIGS. 9, 19, and 20. In the present exemplary embodiment, a bit stream is input frame by frame. The bit stream is divided into coded data pieces, each of which corresponds to one block, and then is decoded. The present exemplary embodiment is configured in such a manner that a bit stream is input frame by frame, but may be configured in such a manner that a frame is divided into slices, and a bit stream is input slice by slice. Further, for simplification of description, the present exemplary embodiment will be described based on only intra prediction decoding processing, but is not limited thereto. The present exemplary embodiment can be also employed to inter prediction decoding processing.

Figure 9:
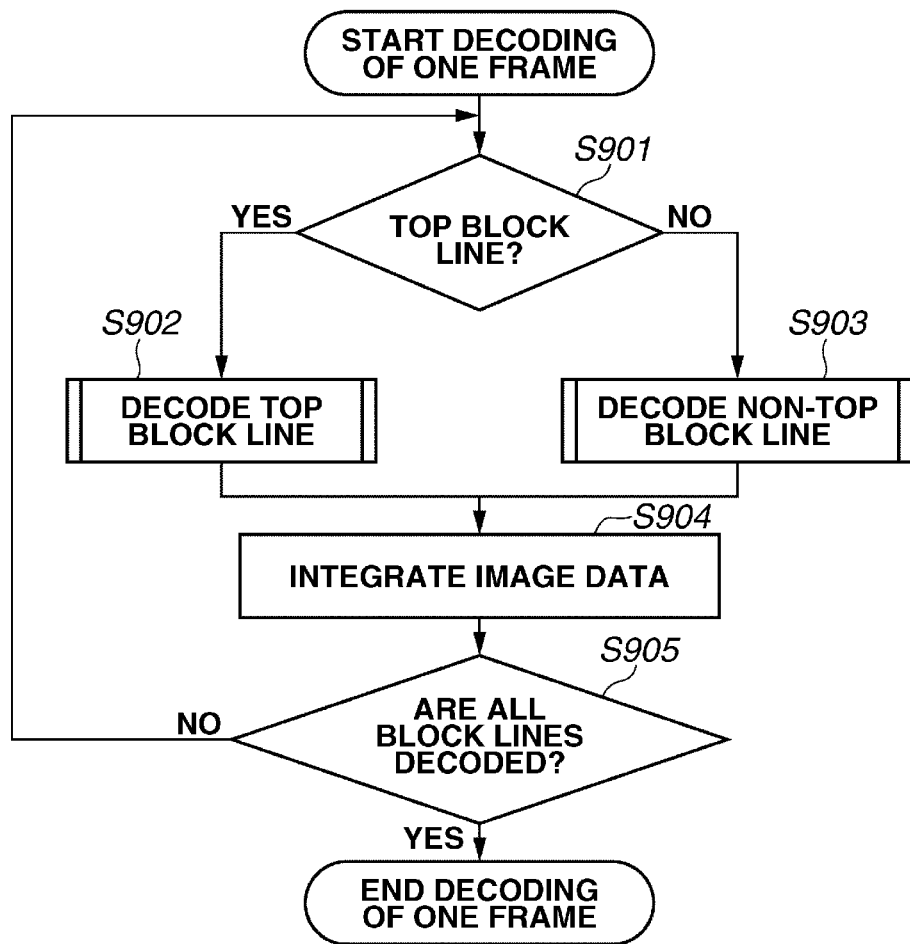
FIG. 9 is a flowchart illustrating processing for decoding a frame by the image decoding apparatus according to the second exemplary embodiment.

First, the processing of steps S901, S904, and S905 illustrated in FIG. 9 is the same as the second exemplary embodiment, and, therefore, the description thereof is omitted here.

Figure 19:
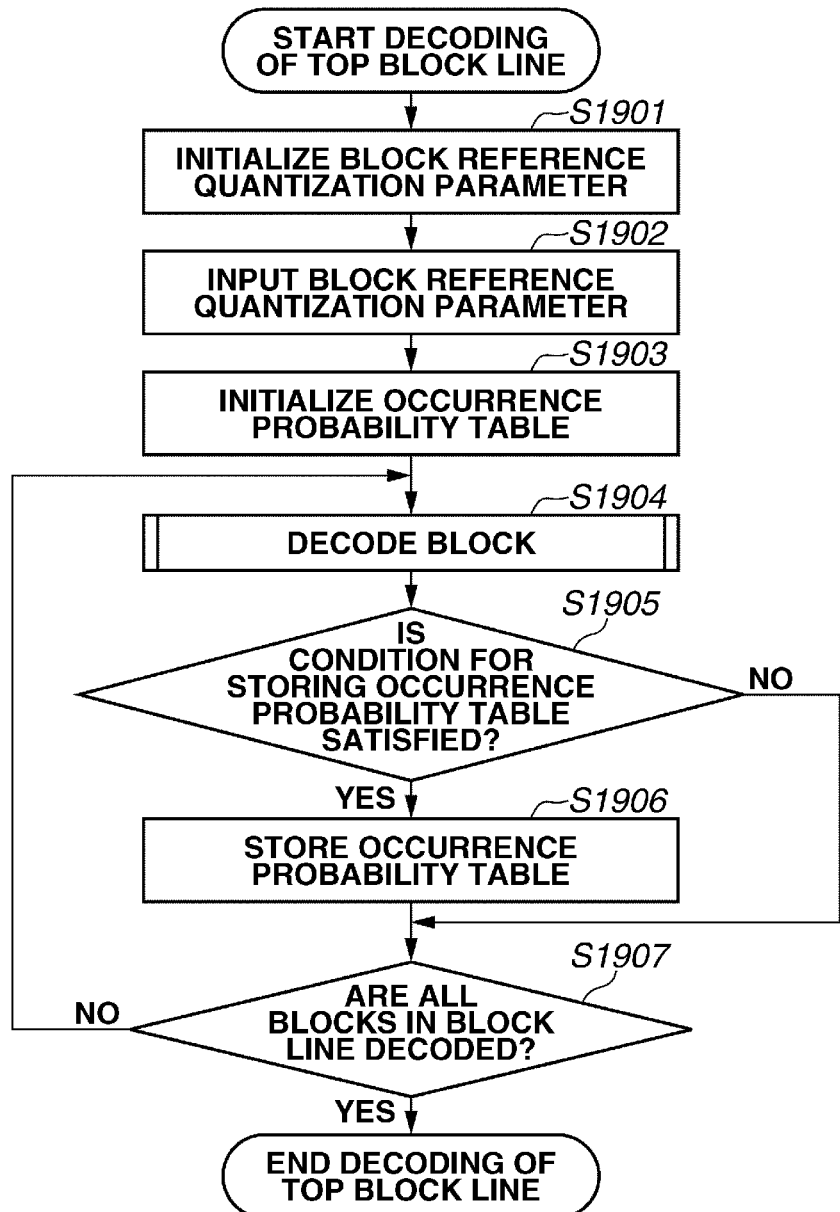
FIG. 19 is a flowchart illustrating processing for decoding a top block line by the image decoding apparatus according to the fourth exemplary embodiment.

The processing of step S902 (the processing for decoding the top block line) will be described in detail with reference to the flowchart illustrated in FIG. 19. Since the top block line is an even-numbered block line, coded data of a processing target block line is input into the first decoding unit 1802 by the selector 1801, and is decoded by the first decoding unit 1802.

First, in step S1901, a quantization parameter, based on which a block is decoded, is initialized so as to match an initial value of a quantization parameter for a slice, and is stored in the initial quantization parameter storage unit 1804. Hereinafter, the quantization parameter, based on which a block is decoded, will be referred to as a "block reference quantization parameter" in a similar manner to the image decoding apparatus according to the second exemplary embodiment. The block quantization parameter when a decoding target block is inversely quantized is in such a state that the value itself is not coded but a difference value thereof from the block reference quantization parameter is coded as a syntax element. Therefore, at the time of decoding, the block quantization parameter should be generated by adding the block reference quantization parameter and the above-described difference value, and the decoding apparatus should perform inverse quantization using the generated block quantization parameter.

Next, in step S1902, the first decoding unit 1802 reads the value from the initial quantization parameter storage unit 1804 as a block reference quantization parameter for decoding the leftmost block in the block line. Next, the processing of steps S1903 to S1907 is similar to the processing of steps S1002, S1003, S1006 to S1008, respectively, and, therefore, the description thereof is omitted here.

Figure 20:
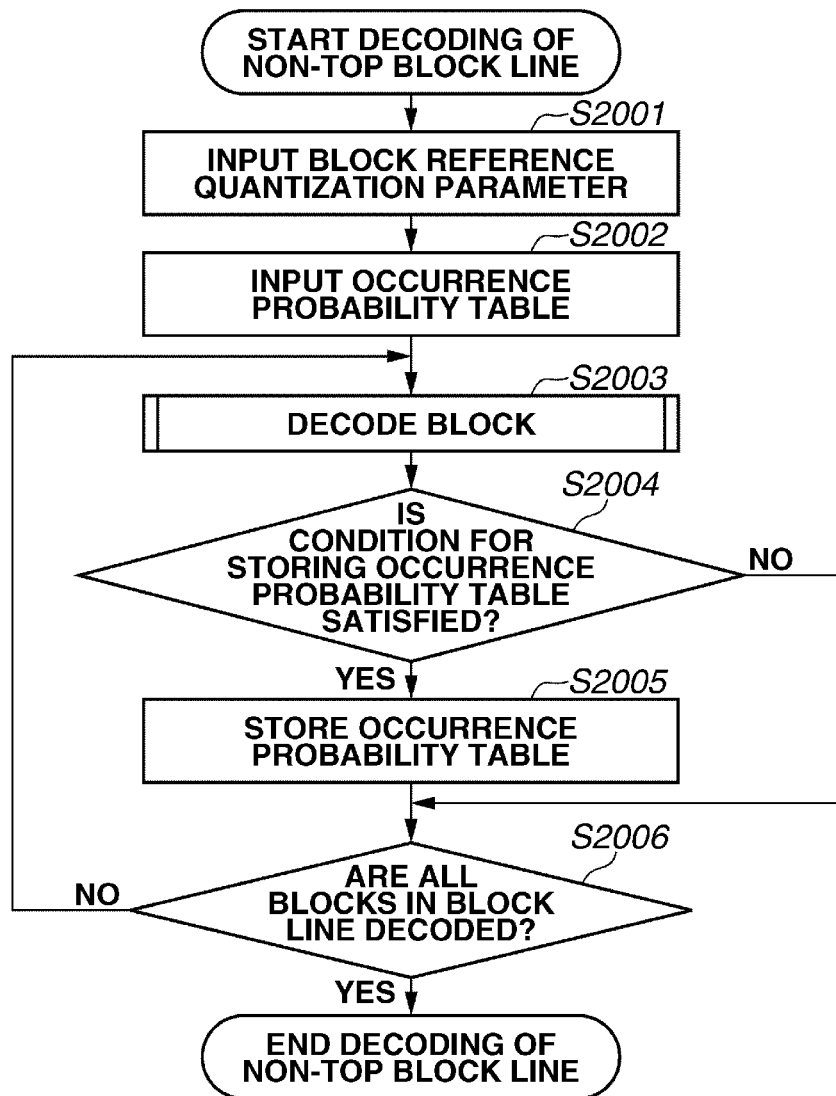
FIG. 20 is a flowchart illustrating processing for decoding a block line other than the top block line by the image decoding apparatus according to the fourth exemplary embodiment.

Subsequently, the processing of step S903 (the processing for decoding a block line other than the top block line) will be described in detail with reference to the flowchart illustrated in FIG. 20. The selector 1801 determines for each block line whether the block line is an even-numbered block line. If the block line is an even-numbered block line, a bit stream of a processing target block is input into the first decoding unit 1802, and is decoded by the first decoding unit 1802. If the block line is an odd-numbered block line, a bit stream of a processing target block is input into the second decoding unit 1803, and is decoded by the second decoding unit 1803. First, a flow when the second decoding unit 1803 decodes an odd-numbered block line will be described.

First, in step S2001, a block reference quantization parameter for decoding the leftmost block in the block line is input from the initial quantization parameter storage unit 1804. Next, in step S2002, the first occurrence probability table is input from the first occurrence probability table storage unit 1805 as a block line reference occurrence probability table.

In step S2003, the second decoding unit 1403 decodes pixel data block by block. The processing of step S2004 is similar to the processing of step S1905, and, therefore, the description thereof is omitted here.

In step S2005, the occurrence probability table is stored in the second occurrence probability table storage unit 1806 as a second occurrence probability table. The second occurrence probability table will be used as a block line reference occurrence probability table when the first decoding unit 1402 arithmetically decodes the leftmost block in the next block line.

The processing of step S2006 is similar to the processing of step S1907, and, therefore, the description thereof is omitted here. Subsequently, a flow when the first decoding unit 1802 decodes an even-numbered block line will be described.

First, in step S2001, a block reference quantization parameter for decoding the leftmost block in the block line is input from the initial quantization parameter storage unit 1804. Next, in step S2002, the second occurrence probability table is input from the second occurrence probability table storage unit 1806 as a block line reference occurrence probability table.

The processing of steps S2003 to S2006 is similar to the processing of steps S1904 to S1907, and, therefore, the description thereof is omitted here.

The above-described configuration and operation enable parallel execution of decoding by allowing reference to a block reference quantization parameter in addition to an occurrence probability table, which is statistical information, during processing of a leftmost block even before completion of processing of a block line immediately before the block line that is currently being decoded.

Further, in the present exemplary embodiment, arithmetic decoding is used for entropy decoding, but the present invention is not limited thereto. Any decoding may be employed, as long as, at the time of entropy decoding based on statistical information such as the occurrence probability table, the statistical information in the middle of decoding of a block line is used to perform entropy decoding of the leftmost block of the next block line.

The present exemplary embodiment has been described based on an example using two decoding units. However, it is apparent that the addition of, for example, a third decoding unit and a third occurrence probability table storage unit enables parallel processing by a larger number of decoding units.

Figure 21:
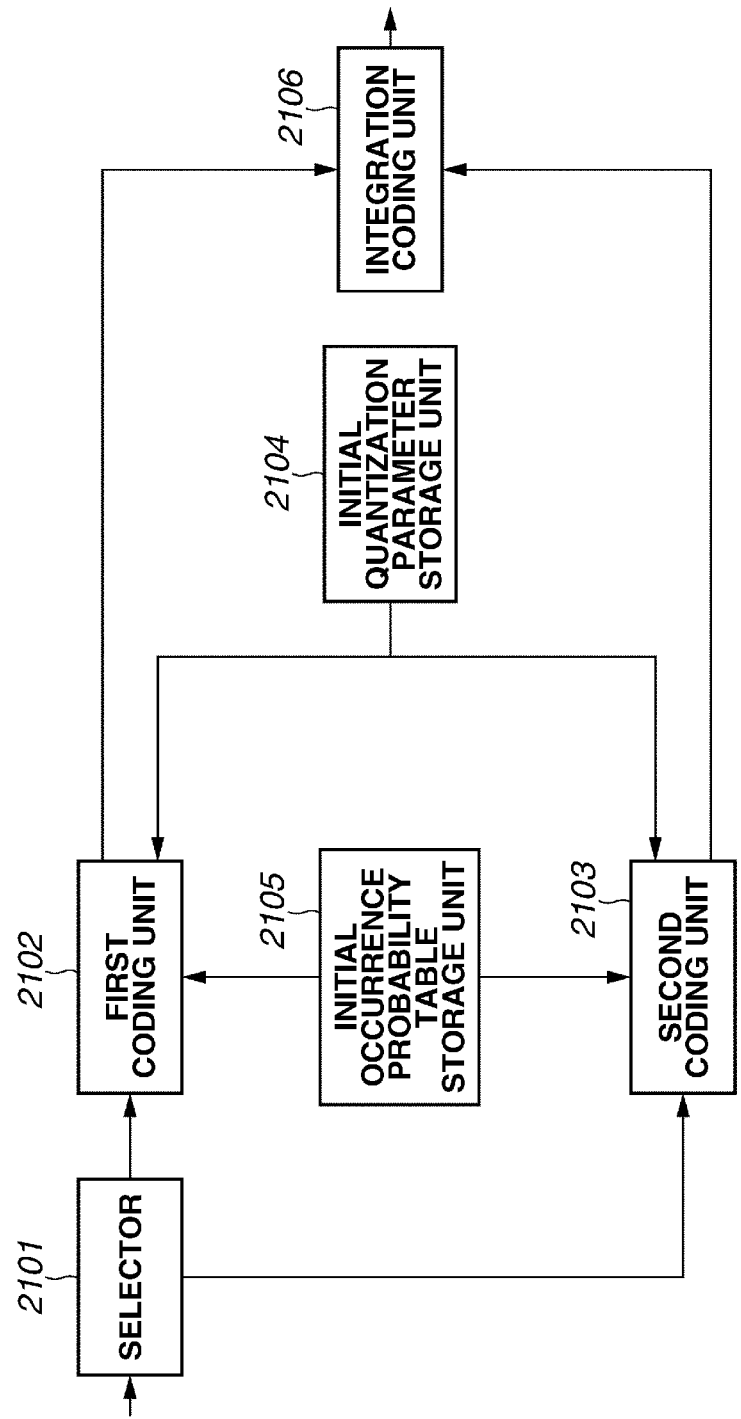
FIG. 21 is a block diagram illustrating a configuration of an image coding apparatus according to a fifth exemplary embodiment.

FIG. 21 is a block diagram illustrating an image coding apparatus according to a fifth exemplary embodiment.

Referring to FIG. 21, a selector 2101 determines whether a processing target block belongs to an even-numbered block line. The selector 2101 outputs the block to a first coding unit 2102 if the block belongs to an even-numbered block line, and otherwise outputs the block to a second coding unit 2103.

The first and second coding units 2102 and 2103 code blocks, into which an input image is divided by n×n pixels ("n" is a positive integer of 2 or larger), line by line as illustrated in FIG. 2 The present exemplary embodiment will be described based on an example using two coding units, but the present invention is not limited thereto. Referring to FIG. 2, the section 201 indicated as the square drawn by the thin line represents a block, and the section 202 indicated as the rectangle drawn by the thick line represents a block line. Further, the blocks in the white areas, which indicate even-numbered block lines including the top block line (the 0-th block line), are coded by the first coding unit 2102. The blocks in the shaded areas, which indicate odd-numbered block lines, are coded by the second coding unit 2103.

Each of the first and second coding units 2102 and 2103 first generates prediction errors according to prediction by referring to pixels surrounding a coding target block or another frame, and performs orthogonal transform to generate transform coefficients. Next, each of the first and second coding units 2102 and 2103 determines a quantization parameter for the orthogonally transformed transform coefficients, and quantizes each transform coefficient to generate quantization coefficients. Next, each of the first and second coding units 2102 and 2103 binarizes each syntax element including the quantization coefficients to generate binary signals. An occurrence probability is assigned to each syntax element in advance as a table (hereinafter referred to as an "occurrence probability table"). The binary signals are arithmetically coded based on the above-described occurrence probability table. Then, each time a binary signal is coded, the occurrence probability table is updated using statistical information indicating whether the coded binary signal is the most probable symbol.

An initial quantization parameter storage unit 2104 stores an initial value of a quantization parameter. An initial occurrence probability table storage unit 2105 stores an initial value of an occurrence probability table. An integration coding unit 2106 integrates coded data generated by the first coding unit 2102 and coded data generated by the second coding unit 2103, and outputs the integrated data as a bit stream.

Figure 22:
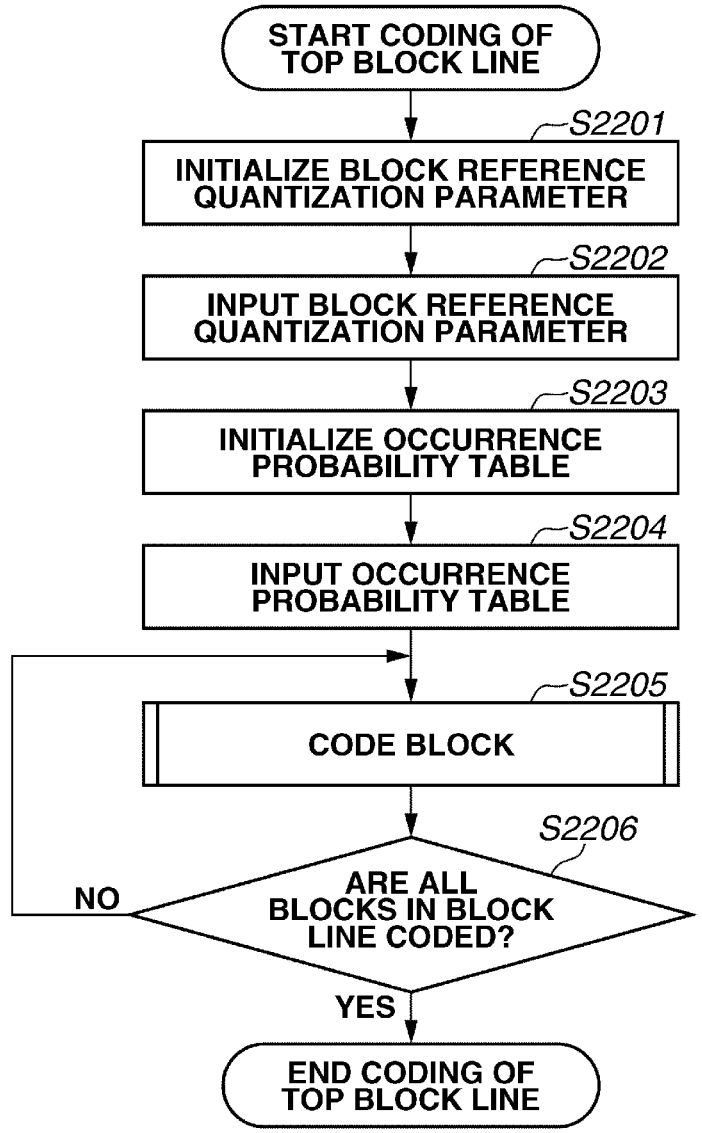
FIG. 22 is a flowchart illustrating processing for coding a top block line according to the fifth exemplary embodiment.
Figure 23:
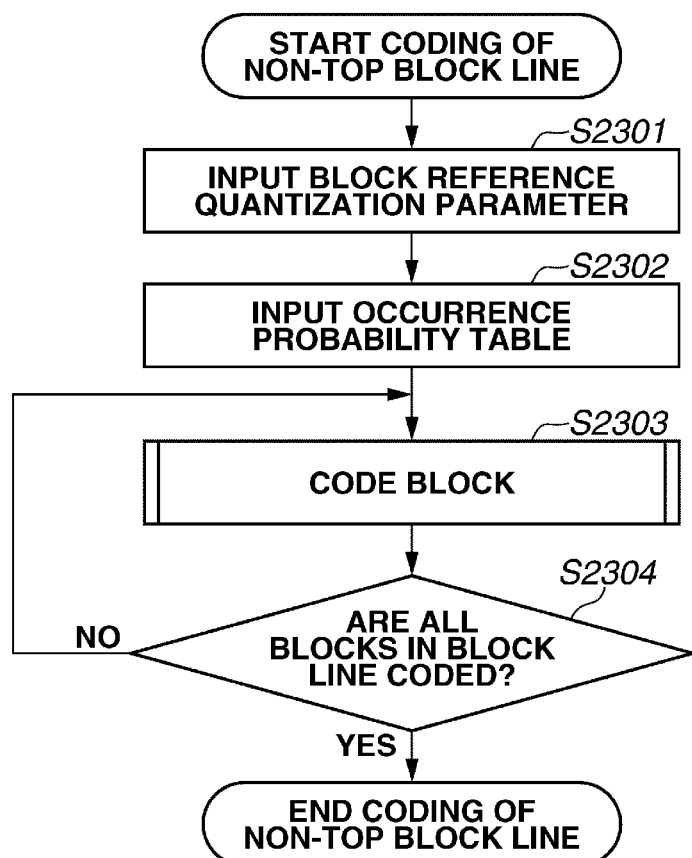
FIG. 23 is a flowchart illustrating processing for coding a block line other than the top block line according to the fifth exemplary embodiment.

An operation of the image coding apparatus according to the present exemplary embodiment will be described in detail with reference to the flowcharts illustrated in FIGS. 3, 22, and 23. In the present exemplary embodiment, moving image data is input frame by frame, is divided into blocks, and is processed in raster order. The present exemplary embodiment is configured to input moving image data frame by frame, but may be configured to input still image data corresponding to one frame or to input image data slice by slice, which a frame is divided into. Further, for simplification of description, the present exemplary embodiment will be described based on only intra prediction coding processing, but is not limited thereto. The present exemplary embodiment can be also employed to inter prediction coding processing.

The processing of steps S301, S304, and S305 illustrated in FIG. 3 is the same as the first exemplary embodiment, and, therefore, the description thereof is omitted here.

The processing of step S302 (the processing for coding the top block line) will be described in detail with reference to the flowchart illustrated in FIG. 22. Since the top block line is an even-numbered block line, a processing target block is input into the first coding unit 2102 by the selector 2101, and is coded by the first coding unit 2102.

First, in step S2201, a quantization parameter, based on which a block is coded, is initialized so as to match an initial value of a quantization parameter for a slice, and is stored in the initial quantization parameter storage unit 2104. Hereinafter, the quantization parameter, based on which a block is coded, will be referred to as a "block reference quantization parameter" in a similar manner to the first exemplary embodiment. Regarding a quantization parameter used to quantize a coding target block, the value thereof itself is not coded as a syntax element, but a difference value thereof from the block reference quantization parameter is coded.

Next, in step S2202, the first coding unit 2102 reads the initialized quantization parameter from the initial quantization parameter storage unit 2104 as a block reference quantization parameter for coding a leftmost block in a block line. Next, in step S2203, an occurrence probability table is initialized by a predetermined method, and is stored in the initial occurrence probability table storage unit 2105. The occurrence probability table stored in the initial occurrence probability table storage unit 2105 is used to arithmetically code the first binary signal of the leftmost block in the block line, and is updated as necessary in step S2205, which will be described below. Hereinafter, the occurrence probability table used to arithmetically code a binary signal of a first block in a block line will be referred to as a "block line reference occurrence probability table" in a similar manner to the first exemplary embodiment.

Next, in step S2204, the first coding unit 2102 reads the initialized quantization parameter from the initial occurrence probability table storage unit 2105 as a block line reference occurrence probability table.

Figure 4:
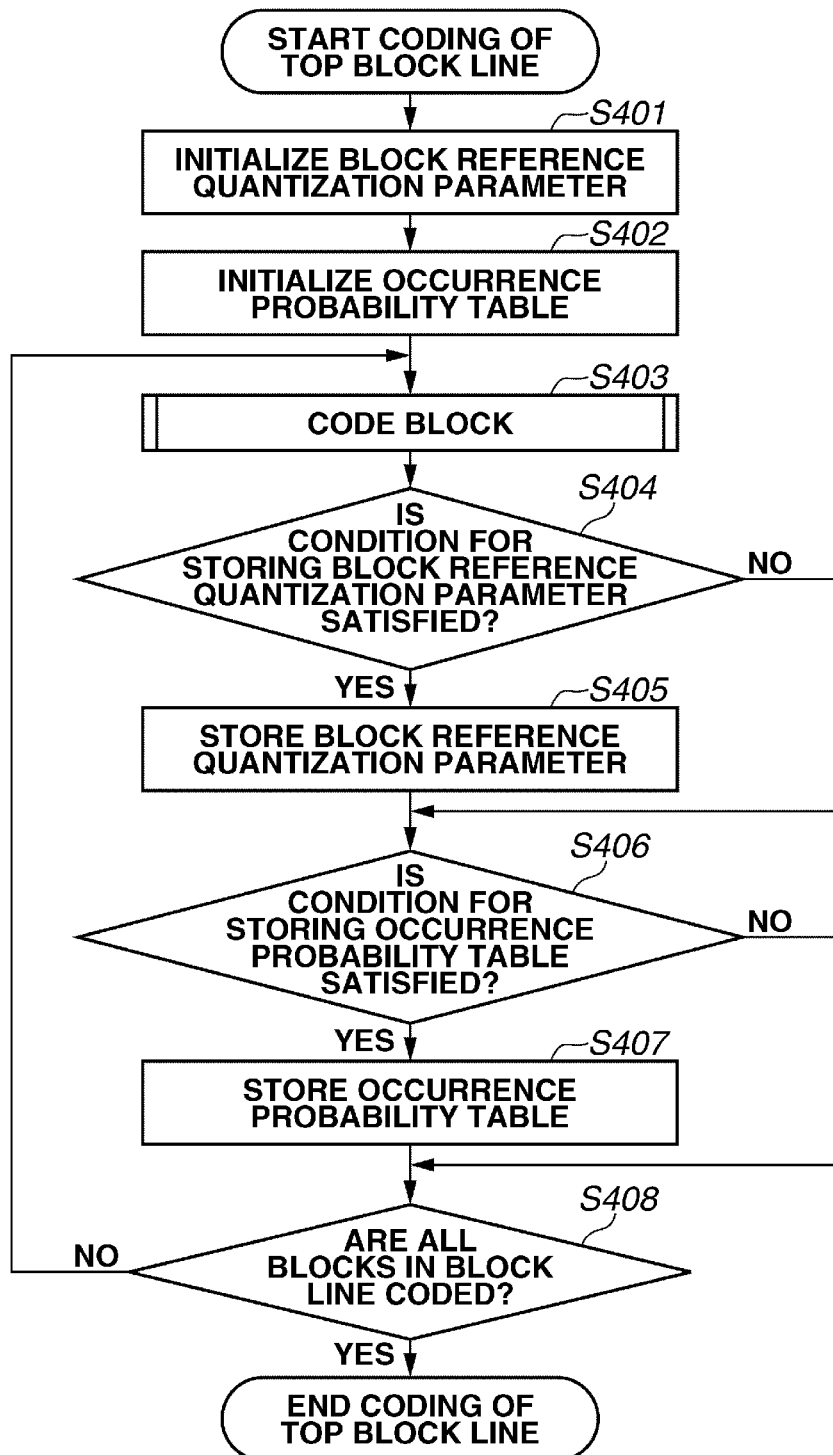
FIG. 4 is a flowchart illustrating processing for coding a top block line by the image coding apparatus according to the first exemplary embodiment.

Next, the processing of steps S2205 and S2206 is similar to the processing of steps S403 and S408 illustrated in FIG. 4, respectively, and, therefore, the description thereof is omitted here. However, in step S2205, the first coding unit 2012 codes pixel data block by block. Subsequently, the processing of step S303 (the processing for coding a block line other than the top block line) will be described in detail with reference to the flowchart illustrated in FIG. 23. The selector 2101 determines for each block line whether the block line is an even-numbered block line. If the block line is an even-numbered block line, an image of the processing target block line is input into the first coding unit 2102 and is coded by the first coding unit 2102. If the block line is an odd-numbered block line, an image of the processing target block line is input into the second coding unit 2103, and is coded by the second coding unit 2103. First, a flow when the second coding unit 2103 codes an odd-numbered block line will be described.

First, in step S2301, a block reference quantization parameter for coding the leftmost block in the block line is input from the initial quantization parameter storage unit 2104.

Next, in step S2302, the value is input from the initial occurrence probability table storage unit 2105 as a block line reference occurrence probability table.

Next, in step S2303, the second coding unit 2103 codes pixel data block by block. The processing of step S2304 is similar to the processing of step S2206 illustrated in FIG. 22. Subsequently, a flow when the first coding unit 2102 codes an even-numbered block line will be described. First, in step S2301, a block reference quantization parameter for coding the leftmost block in the block line is input from the initial quantization parameter storage unit 2104. Next, in step S2302, the value is input from the initial occurrence probability table storage unit 2105 as a block line reference occurrence probability table.

The processing of steps S2303 and S2304 is similar to the processing of steps S2205 and S2206, and, therefore, the description thereof is omitted here.

The above-described configuration and operation enable parallel execution of coding by using an occurrence probability table, which is statistical information, and an initialized value as a block reference quantization parameter during processing of a leftmost block even before completion of processing of a block line immediately before the block line that is currently being coded. Further, in the present exemplary embodiment, arithmetic coding is used for entropy coding, but the present invention is not limited thereto. Any coding method may be employed, as long as statistical information is initialized at the beginning of coding processing, coding processing is performed with use of the statistical information, and the statistical information is updated each time coding processing is performed.

The present exemplary embodiment has been described based on an example using two coding units. However, it is apparent that the addition of, for example, a third coding unit enables parallel processing by a larger number of coding units.

Figure 24:
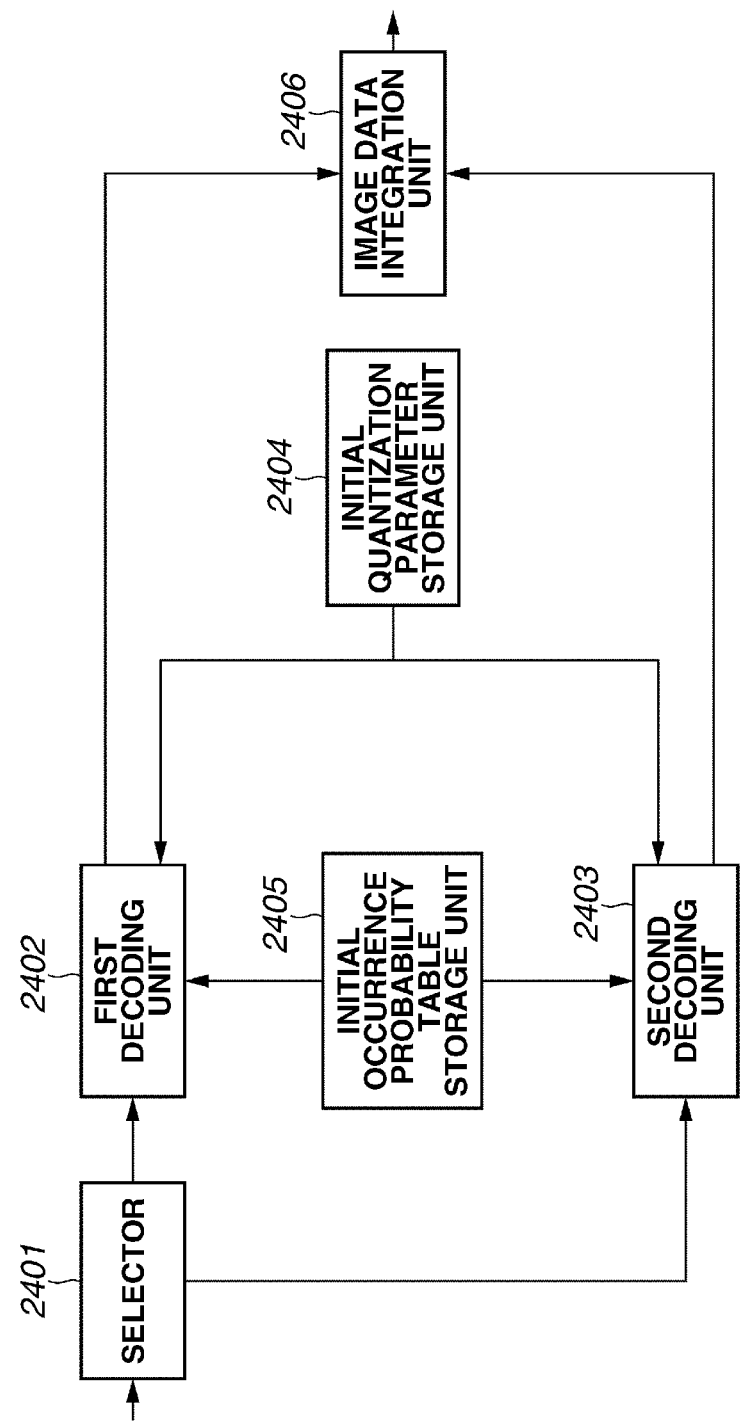
FIG. 24 is a block diagram illustrating a configuration of an image decoding apparatus according to a sixth exemplary embodiment.

FIG. 24 is a block diagram illustrating an image decoding apparatus according to a sixth exemplary embodiment.

Referring to FIG. 24, a selector 2401 determines whether a processing target block belongs to an even-numbered block line. The selector 2401 outputs the block to a first decoding unit 2402 if the block belongs to an even-numbered block line, and otherwise outputs the block to a second decoding unit 2403.

The first and second decoding units 2402 and 2403 decode the input bit stream, line by line as illustrated in FIG. 2. Hereinafter, a line of blocks will be referred to as a "block line". The present exemplary embodiment will be described based on an example using two decoding units, but the present invention is not limited thereto. Referring to FIG. 2, the section 201 indicated as the square drawn by the thin line represents a block, and the section 202 indicated as the rectangle drawn by the thick line represents a block line. Further, the blocks in the white areas, which indicate even-numbered block lines including the top block line (the 0-th block line), are decoded by the first decoding unit 2402. The blocks in the shaded areas, which indicate odd-numbered block lines, are decoded by the second decoding unit 2403.

Each of the first and second decoding units 2402 and 2403 first selects an occurrence probability table for a binary signal of a bit stream that is a decoding target, and arithmetically decodes the binary signal based on the occurrence probability table to generate quantization coefficients. Next, each of the first and second decoding units 2402 and 2403 inversely quantizes the quantization coefficients based on a quantization parameter to generate transform coefficients. Then, each of the first and second decoding units 2402 and 2403 performs inverse orthogonal transform on the transform coefficients to generate prediction errors. Next, each of the first and second decoding units 2402 and 2403 performs prediction by referring to pixels surrounding the decoding target block or another frame to generate image data of the decoding target block.

An initial quantization parameter storage unit 2404 stores an initial value of a quantization parameter. An initial occurrence probability table storage unit 2405 stores an initial value of an occurrence probability table. An image data integration unit 2406 shapes image data generated by the first decoding unit 2402 and image data generated by the second decoding unit 2403, and outputs the shaped data.

Figure 25:
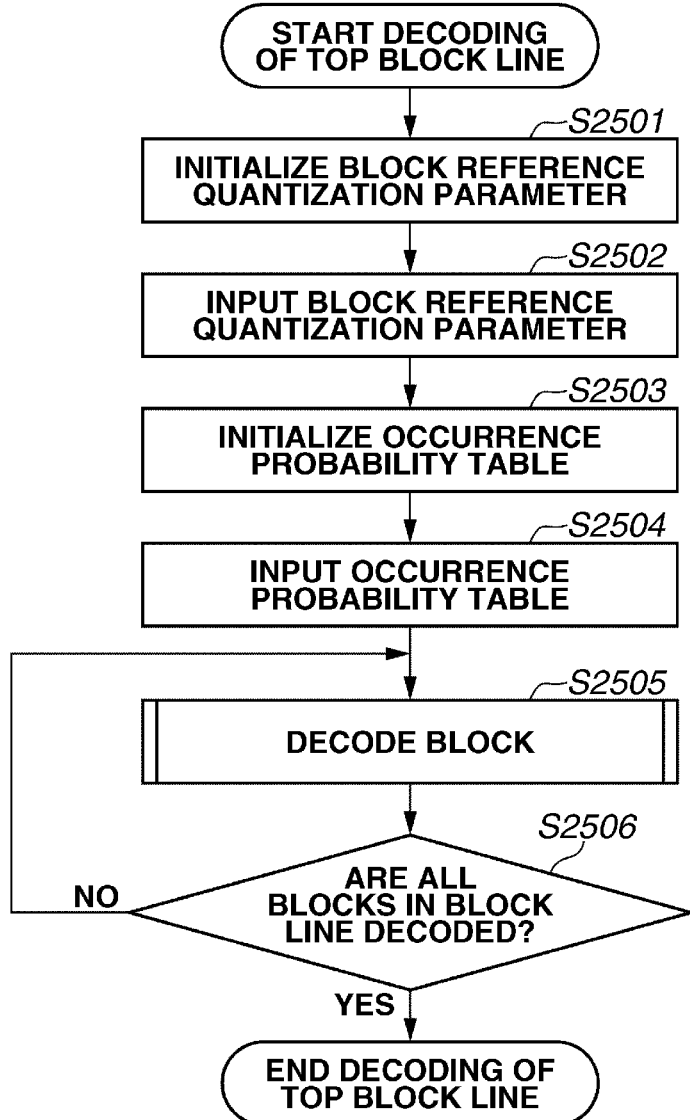
FIG. 25 is a flowchart illustrating processing for decoding a top block line according to the sixth exemplary embodiment.
Figure 26:
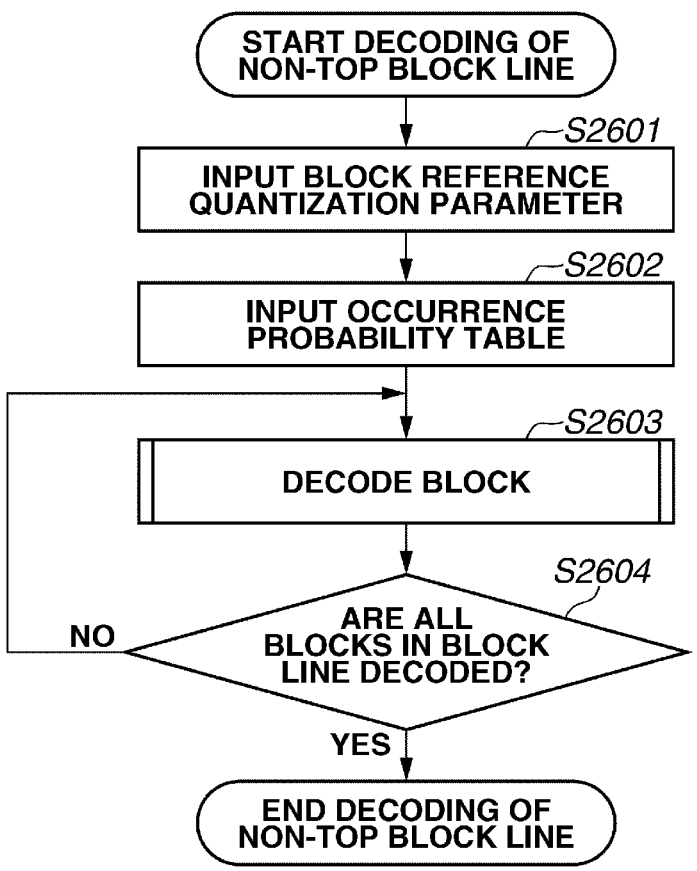
FIG. 26 is a flowchart illustrating processing for decoding a block line other than the top block line according to the sixth exemplary embodiment.

An operation of the image decoding apparatus according to the present exemplary embodiment will be described in detail with reference to the flowcharts illustrated in FIGS. 9, 25, and 26. In the present exemplary embodiment, a bit stream is input frame by frame. The bit stream is divided into coded data pieces, each of which corresponds to one block, and then is decoded. The present exemplary embodiment is configured in such a manner that a bit stream is input frame by frame, but may be configured in such a manner that a frame is divided into slices, and a bit stream is input slice by slice. Further, for simplification of description, the present exemplary embodiment will be described based on only intra prediction decoding processing, but is not limited thereto. The present exemplary embodiment can be also employed to inter prediction decoding processing.

The processing of steps S901, S904, and S905 illustrated in FIG. 9 are the same as the second exemplary embodiment, and, therefore, the description thereof is omitted here.

The processing of step S902 (the processing for decoding the top block line) will be described in detail with reference to the flowchart illustrated in FIG. 25. Since the top block line is an even-numbered block line, coded data of a processing target block line is input into the first decoding unit 2402 by the selector 2401, and is decoded by the first decoding unit 2402.

First, in step S2501, a quantization parameter, based on which a block is decoded, is initialized so as to match an initial value of a quantization parameter for a slice, and is stored in the initial quantization parameter storage unit 2404. Hereinafter, the quantization parameter, based on which a block is decoded, will be referred to as a "block reference quantization parameter" in a similar manner to the second exemplary embodiment. The block quantization parameter when a decoding target block is inversely quantized is in such a state that the value itself is not coded but a difference value thereof from the block reference quantization parameter is coded as a syntax element. Therefore, at the time of decoding, the block quantization parameter should be generated by adding the block reference quantization parameter and the above-described difference value, and the decoding apparatus should perform inverse quantization.

Next, in step S2502, the first decoding unit 2402 reads the value from the initial quantization parameter storage unit 2404 as a block reference quantization parameter for coding the leftmost block in the block line. Next, in step S2503, the occurrence probability table is initialized by a predetermined method, and is stored in the initial occurrence probability table storage unit 2405. The occurrence probability table stored in the initial occurrence probability table storage unit 2405 is used to arithmetically decode the first binary signal of the leftmost block in the block line, and is updated as necessary in step S2505, which will be described below. Hereinafter, the occurrence probability table used to arithmetically decode a first binary signal of an initial block in a block line will be referred to as a "block line reference occurrence probability table", in a similar manner to the second exemplary embodiment.

Next, in step S2504, the first decoding unit 2402 reads the value from the initial occurrence probability table storage unit 2405 as a block line reference occurrence probability table.

Next, the processing of steps S2505 and S2506 is similar to the processing of steps S1003 and S1008 illustrated in FIG. 10, respectively, and, therefore, the description thereof is omitted here.

However, in step S2505, the first decoding unit 2402 decodes pixel data block by block.

Subsequently, the processing of step S903 (the processing for decoding a block line other than the top block line) will be described in detail with reference to the flowchart illustrated in FIG. 26. The selector 2401 determines for each block line whether the block line is an even-numbered block line. If the block line is an even-numbered block line, a bit stream of the processing target block is input into the first decoding unit 2402, and is decoded by the first decoding unit 2402. If the block line is an odd-numbered block line, a bit stream of the processing target block is input into the second decoding unit 2403, and is decoded by the second decoding unit 2403. First, a flow when the second decoding unit 2403 decodes an odd-numbered block line will be described.

First, in step S2601, a block reference quantization parameter for decoding the leftmost block in the block line is input from the initial quantization parameter storage unit 2404.

Next, in step S2602, the value is input from the initial occurrence probability table storage unit 2405 as a block line reference occurrence probability table.

Next, in step S2603, the second decoding unit 2403 decodes pixel data block by block. The processing of step S2604 is similar to the processing of step S2506 illustrated in FIG. 25. Subsequently, a flow when the first decoding unit 2402 decodes an even-numbered block line will be described. First, in step S2601, a block reference quantization parameter for decoding the leftmost block in the block line is input from the initial quantization parameter storage unit 2404. Next, in step S2602, the value is input from the initial occurrence probability table storage unit 2405 as a block line reference occurrence probability table.

The processing of steps S2603 and S2604 is similar to the processing of steps S2505 and S2506, and, therefore, the description thereof is omitted here.

The above-described configuration and operation enable parallel execution of decoding by using an occurrence probability table, which is statistical information, and an initialized value as a block reference quantization parameter during processing of a leftmost block even before completion of processing of a block line immediately before a block line that is currently being decoded.

Further, in the present exemplary embodiment, arithmetic decoding is used for entropy decoding, but the present invention is not limited thereto. Any decoding method may be employed, as long as statistical information is initialized at the beginning of decoding processing, decoding processing is performed with use of the statistical information, and the statistical information is updated each time decoding processing is performed.

The present exemplary embodiment has been described based on an example using two decoding units. However, it is apparent that the addition of, for example, a third decoding unit enables parallel processing by a larger number of decoding units.

The above-described exemplary embodiments have been described assuming that the respective processing units illustrated in FIGS. 1, 8, 14, 18, 21, and 24 are realized by hardware apparatuses. However, the processing performed by the respective processing units illustrated in FIGS. 1, 8, 14, 18, 21, and 24 may be realized by a computer program.

Figure 13:
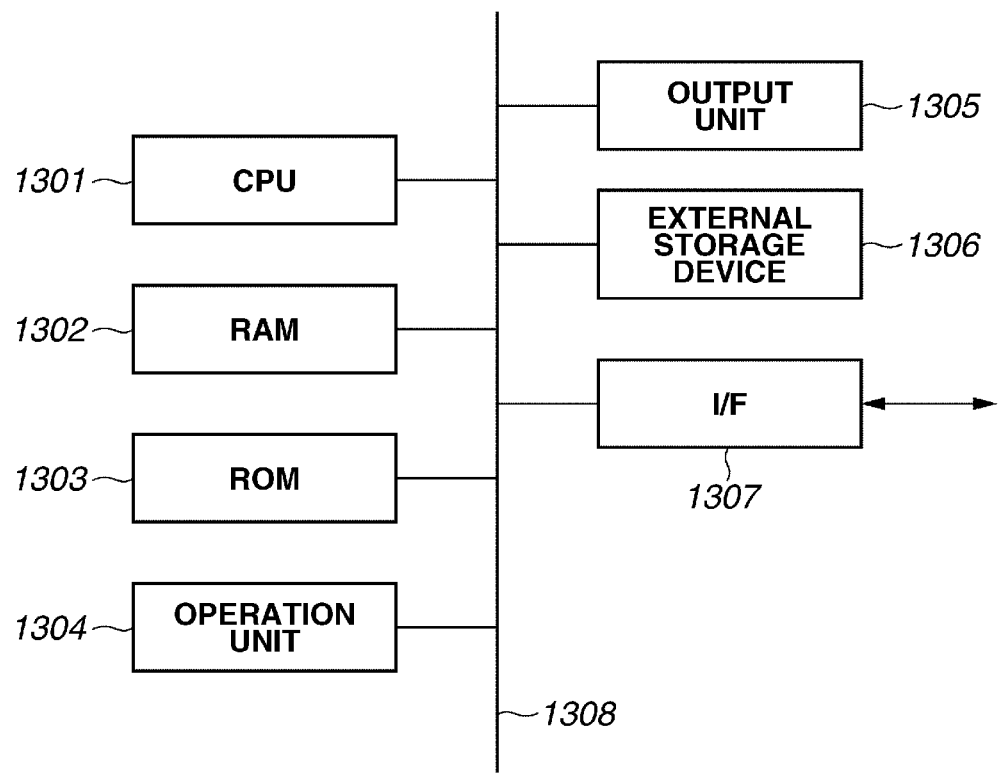
FIG. 13 is a block diagram illustrating an example of a hardware configuration of a computer employable as the image coding apparatuses and image decoding apparatuses according to the exemplary embodiments of the present invention.

FIG. 13 is a block diagram illustrating an example of a hardware configuration of a computer employable as the image processing apparatuses according to the above-described respective exemplary embodiments.

A central processing unit (CPU) 1301 controls the entire computer with use of a computer program and data stored in a random access memory (RAM) 1302 and a read only memory (ROM) 1303, and performs the respective kinds of processing that have been described to be performed by the image processing apparatuses according to the above-described respective exemplary embodiments. In other words, the CPU 1301 functions as the respective processing units illustrated in FIGS. 1, 8, 14, 18, 21 and 24.

The RAM 1302 has an area for temporarily storing, for example, a computer program and data loaded from an external storage device 1306, and data acquired from the outside via an interface (I/F) 1307. Further, the RAM 1302 has a work area used when the CPU 1301 performs various kinds of processing. In other words, for example, the RAM 1302 can be assigned as a frame memory or can provide other various kinds of areas as necessary.

The ROM 1303 stores, for example, setting data of the present computer and a boot program. An operation unit 1304 includes a keyboard and a mouse. A user of the present computer can input various kinds of instructions to the CPU 1301 by operating the operation unit 1304. A display unit 1305 displays a result of processing performed by the CPU 1301. Further, the display unit 1305 includes a display device such as a liquid crystal display.

The external storage device 1306 is a large-capacity information storage device represented by a hard disk drive device. The external storage device 1306 stores an operating system (OS), and the computer program for enabling the CPU 1301 to realize the functions of the respective units illustrated in FIGS. 1, 8, 14, 18, 21 and 24. Further, the external storage device 1306 may store image data as a processing target.

The computer program and data stored in the external storage device 1306 are loaded to the RAM 1302 as necessary according to the control by the CPU 1301, and are processed by the CPU 1301. A network such as a local area network (LAN) and the Internet, and another device such as a projection device and a display device can be connected to the I/F 1307. The computer can acquire and transmit various kinds of information via the I/F 1307. A bus 1308 connects the above-described respective units to one another.

As the operation by the above-described configuration, the CPU 1301 plays a central role in controlling the operations explained with reference to the above-described flowcharts.

The present invention can be also embodied by supplying a storage medium storing codes of the computer program capable of realizing the above-described functions to a system, and causing the system to read out and execute the codes of the computer program. In this case, the codes of the computer program read from the storage medium realize the functions of the above-described exemplary embodiments, and the storage medium storing the codes of the computer program is within the scope of the present invention. Alternatively, an operating system (OS) or the like that works on a computer may perform a part or all of actual processing based on instructions of the codes of the computer program, thereby realizing the above-described functions by this processing. This case is also within the scope of the present invention.

Further alternatively, the present invention may be embodied by the following embodiment; the codes of the computer program read from the storage medium may be written in a function expansion card inserted in a computer or a memory provided to a function expansion unit connected to a computer, and a CPU or the like provided to the function expansion card or the function expansion unit may perform a part or all of actual processing based on instructions of the codes of the computer program, thereby realizing the above-described functions. This case is also within the scope of the present invention.

In a case where the present invention is embodied by the above-described storage medium, the storage medium stores the codes of the computer program corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-243940 filed Nov. 7, 2011, which is hereby incorporated by reference herein in its entirety.

The invention claimed is:

1. An image coding apparatus configured to code an image in units of slices each of which includes a plurality of blocks, the image coding apparatus comprising:
a coding unit configured to code blocks included in a first row of a slice and code blocks included in a second row, different from the first row, of the slice,
wherein, when coding a first quantization parameter in coding order of the first row, the coding unit uses a slice quantization parameter that is provided to the slice as an initial value,
wherein, when coding a first quantization parameter in coding order of the second row, the coding unit uses the slice quantization parameter that is provided to the slice as the initial value and that is used when coding the first quantization parameter in coding order of the first row, and
wherein, when coding a second quantization parameter in coding order of the second row, the coding unit uses the first quantization parameter in coding order of the second row.

2. The image coding apparatus according to claim 1, wherein, when coding a first block in coding order of the second row, the coding unit uses statistical information obtained before a block following a predetermined block included in the first row is entropy-coded by the coding unit.

3. The image coding apparatus according to claim 2, wherein the predetermined block is a block located second from the first block among the blocks included in the first row.

4. The image coding apparatus according to claim 2, wherein the predetermined block is a block located second from a left-end block among the blocks included in the first row.

5. The image coding apparatus according to claim 2, wherein the statistical information is information indicating an occurrence probability of a coded binary signal.

6. The image coding apparatus according to claim 1, wherein the first quantization parameter is SliceQP assigned to the slice as the initial value.

7. The image coding apparatus according to claim 1, wherein the coding unit performs coding using a Wavefront method.

8. The image coding apparatus according to claim 1, wherein the coding unit codes blocks included in the first row of the slice including a plurality of block rows.

9. The image coding apparatus according to claim 8, wherein the size of each of the first row and the second row in a vertical direction is equal to a maximum size of the block in the vertical direction.

10. An image decoding apparatus configured to decode code data coded in units of slices each of which includes a plurality of blocks, the image decoding apparatus comprising:
a decoding unit configured to decode blocks included in a first row of a slice and decode blocks included in a second row, different from the first row, of the slice,
wherein, when decoding a first quantization parameter in decoding order of the first row, the decoding unit uses a slice quantization parameter that is provided to the slice as an initial value,
wherein, when decoding a first quantization parameter in decoding order of the second row, the decoding unit uses the slice quantization parameter that is provided to the slice as the initial value and that is used when decoding the first quantization parameter in decoding order of the first row, and
wherein, when decoding a second quantization parameter in decoding order of the second row, the decoding unit uses the first quantization parameter in decoding order of the second row.

11. The image decoding apparatus according to claim 10, wherein, when decoding a first block in decoding order of the second row, the decoding unit uses statistical information obtained before a block following a predetermined block included in the first row is entropy-decoded by the decoding unit.

12. The image decoding apparatus according to claim 11, wherein the predetermined block is a block located second from the first block among the blocks included in the first row.

13. The image decoding apparatus according to claim 11, wherein the predetermined block is a block located second from a left-end block among the blocks included in the first row.

14. The image decoding apparatus according to claim 11, wherein the statistical information is information indicating an occurrence probability of a coded binary signal.

15. The image decoding apparatus according to claim 10, wherein the first quantization parameter is SliceQP assigned to the slice as the initial value.

16. The image decoding apparatus according to claim 10, wherein the decoding unit performs decoding using a Wavefront method.

17. The image decoding apparatus according to claim 10, wherein the decoding unit decodes blocks included in the first row of the slice including a plurality of block rows.

18. The image decoding apparatus according to claim 10, wherein the size of each of the first row and the second row in a vertical direction is equal to a maximum size of the block in the vertical direction.

19. The image coding apparatus according to claim 1, wherein the first row and the second row are a line of the blocks.

20. The image decoding apparatus according to claim 10, wherein the first row and the second row are a line of the blocks.

21. An image coding method for coding an image in units of slices each of which includes a plurality of blocks, the image coding method comprising:

a coding step of coding blocks included in a first row of a slice and coding blocks included in a second row, different from the first row, of the slice wherein, when coding a first quantization parameter in coding order of the first row, the coding step uses a slice quantization parameter that is provided to the slice as an initial value, wherein, when coding a first quantization parameter in coding order of the second row, the coding step uses the slice quantization parameter that is provided to the slice as the initial value and that is used when coding the first quantization parameter in coding order of the first row, and wherein, when coding a second quantization parameter in coding order of the second row, the coding step uses the first quantization parameter in coding order of the second row.

22. An image decoding method for decoding code data coded in units of slices each of which includes a plurality of blocks, the image decoding method comprising:

a decoding step of decoding blocks included in a first row of a slice and decoding blocks included in a second row, different from the first row, of the slice, wherein, when decoding a first quantization parameter in decoding order of the first row, the decoding step uses a slice quantization parameter that is provided to the slice as an initial value, wherein, when decoding a first quantization parameter in decoding order of the second row, the decoding step uses the slice quantization parameter that is provided to the slice as the initial value and that is used when decoding the first quantization parameter in decoding order of the first row, and wherein, when decoding a second quantization parameter in decoding order of the second row, the decoding step uses the first quantization parameter in decoding order of the second row.

23. A non-transitory computer-readable storage medium storing computer-executable instructions that, when loaded and executed by a computer, cause the computer to perform an image coding method for coding an image in units of slices each of which includes a plurality of blocks, the image coding method comprising:

a coding step of coding blocks included in a first row of a slice and coding blocks included in a second row, different from the first row, of the slice, wherein, when coding a first quantization parameter in coding order of the first row, the coding step uses a slice quantization parameter that is provided to the slice as an initial value, wherein, when coding a first quantization parameter in coding order of the second row, the coding step uses the slice quantization parameter that is provided to the slice as the initial value and that is used when coding the first quantization parameter in coding order of the first row, and wherein, when coding a second quantization parameter in coding order of the second row, the coding step uses the first quantization parameter in coding order of the second row.

24. A non-transitory computer-readable storage medium storing computer-executable instructions that, when loaded and executed by a computer, cause the computer to perform an image decoding method for decoding code data coded in units of slices each of which includes a plurality of blocks, the image decoding method comprising:

a decoding step of decoding blocks included in a first row of a slice and decoding blocks included in a second row, different from the first row, of the slice, wherein, when decoding a first quantization parameter in decoding order of the first row, the decoding step uses a slice quantization parameter that is provided to the slice as an initial value, wherein, when decoding a first quantization parameter in decoding order of the second row, the decoding step uses the slice quantization parameter that is provided to the slice as the initial value and that is used when decoding the first quantization parameter in decoding order of the first row, and wherein, when decoding a second quantization parameter in decoding order of the second row, the decoding step uses the first quantization parameter in decoding order of the second row.

25. The image coding apparatus according to claim 1, wherein the coding unit includes a first coding unit configured to code blocks included in the first row of the slice, and a second coding unit configured to code blocks included in the second row of the slice.

26. The image coding apparatus according to claim 25, wherein, after a predetermined number-th block from a first block in coding order is coded by the first coding unit, the second coding unit codes a block included in the second row in parallel with processing for coding a block following the predetermined number-th block by the first coding unit.

27. The image coding apparatus according to claim 25, wherein, when coding a quantization parameter of a block other than a first block in coding order of the first row of the slice, the first coding unit refers to a quantization parameter used for a block coded by the first coding unit immediately before the block other than the first block in coding order of the first row, and wherein, when coding a quantization parameter of a block other than the first block in coding order of the second row of the slice, the second coding unit refers to a quantization parameter used for a block coded by the second coding unit immediately before the block other than the first block in coding order of the second row.

28. The image coding apparatus according to claim 1, wherein, the first quantization parameter in coding order of the first row is a quantization parameter of a left-end block of the first low, and wherein, the first quantization parameter in coding order of the second row is a quantization parameter of a left-end block of the second row.

29. The image decoding apparatus according to claim 10, wherein the decoding unit includes a first decoding unit configured to decode blocks included in the first row of the slice, and a second decoding unit configured to decode blocks included in the second row of the slice.

30. The image decoding apparatus according to claim 29, wherein, after a predetermined number-th block from a first block in decoding order is decoded by the first decoding unit, the second decoding unit decodes a block included in the second row in parallel with processing for decoding a block following the predetermined number-th block by the first decoding unit.

31. The image decoding apparatus according to claim 29, wherein, when decoding a quantization parameter of a block other than a first block in decoding order of the first row of the slice, the first decoding unit refers to a quantization parameter used for a block decoded by the first decoding unit immediately before the block other than the first block in decoding order of the first row, and wherein, when decoding a quantization parameter of a block other than the first block in decoding order of the second row of the slice, the second decoding unit refers to a quantization parameter used for a block decoded by the second decoding unit immediately before the block other than the first block in decoding order of the second row.

32. The image decoding apparatus according to claim 10, wherein, the first quantization parameter in decoding order of the first row is a quantization parameter of a left-end block of the first row, and wherein, the first quantization parameter in decoding order of the second row is a quantization parameter of a left-end block of the second row.

* * * * *